US011208541B2

(12) United States Patent
Furukawa et al.

(10) Patent No.: US 11,208,541 B2
(45) Date of Patent: *Dec. 28, 2021

(54) PREPREG AND CARBON FIBER REINFORCED MATERIAL

(71) Applicant: TORAY INDUSTRIES, INC., Tokyo (JP)

(72) Inventors: Koji Furukawa, Ehime (JP); Atsuhito Arai, Ehime (JP); Atsuki Sugimoto, Ehime (JP); Masahiro Mino, Ehime (JP); Mayumi Mihara, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 89 days.

This patent is subject to a terminal disclaimer.

(21) Appl. No.: 16/633,904

(22) PCT Filed: May 28, 2018

(86) PCT No.: PCT/JP2018/020397
§ 371 (c)(1),
(2) Date: Jan. 24, 2020

(87) PCT Pub. No.: WO2019/021613
PCT Pub. Date: Jan. 31, 2019

(65) Prior Publication Data
US 2021/0087362 A1    Mar. 25, 2021

(30) Foreign Application Priority Data

Jul. 28, 2017 (JP) .............................. JP2017-146291

(51) Int. Cl.
| | | |
|---|---|---|
| *C08K 9/04* | (2006.01) | |
| *C08K 3/04* | (2006.01) | |
| *C08K 5/1515* | (2006.01) | |
| *C08K 7/06* | (2006.01) | |

(52) U.S. Cl.
CPC .................. *C08K 9/04* (2013.01); *C08K 3/04* (2013.01); *C08K 5/1515* (2013.01); *C08K 7/06* (2013.01)

(58) Field of Classification Search
CPC ... C08K 7/06; C08K 9/04; C08K 3/04; C08K 5/1515; C08L 63/00; C08J 5/24; C08J 5/06; C08J 5/042; C08J 2363/02; C08J 2363/00
USPC ........................................................ 523/207
See application file for complete search history.

(56) References Cited

U.S. PATENT DOCUMENTS

| | | | |
|---|---|---|---|
| 9,765,194 B2* | 9/2017 | Arai ........................ B29C 70/46 |
| 2012/0149807 A1 | 7/2012 | Asaumi et al. | |
| 2014/0329075 A1* | 11/2014 | Ichikawa ................... C08J 5/06 |
| | | | 428/298.7 |
| 2015/0210813 A1 | 7/2015 | Arai et al. | |
| 2017/0327657 A1 | 11/2017 | Arai et al. | |
| 2017/0349695 A1 | 12/2017 | Katagi et al. | |
| 2018/0001165 A1 | 1/2018 | Yoshihiro et al. | |
| 2021/0115208 A1* | 4/2021 | Sugimoto ................ C08J 5/042 |

FOREIGN PATENT DOCUMENTS

| | | |
|---|---|---|
| EP | 0156148 A2 | 10/1985 |
| EP | 2878617 A1 | 6/2015 |
| JP | 60-231738 A | 11/1985 |
| JP | 6-94515 B2 | 11/1994 |
| JP | 7-278412 A | 10/1995 |
| JP | 2001-139662 A | 5/2001 |
| WO | WO 2011/034114 A1 | 3/2011 |
| WO | WO 2011/118368 A1 | 9/2011 |
| WO | WO 2014/017340 A1 | 1/2014 |
| WO | WO 2015/125674 A1 | 8/2015 |
| WO | WO 2016/104788 A1 | 6/2016 |
| WO | WO 2016/157933 A1 | 10/2016 |

OTHER PUBLICATIONS

Extended European Search Report for European Application No. 18838951.4, dated Mar. 19, 2021.
International Search Report, issued in PCT/JP2018/020397, PCT/ISA/210, dated Jul. 31, 2018.
Written Opinion of the International Searching Authority, issued PCT/JP2018/020397, PCT/ISA/237, dated Jul. 31, 2018.

* cited by examiner

*Primary Examiner* — Hannah J Pak
(74) *Attorney, Agent, or Firm* — Birch, Stewart, Kolasch & Birch, LLP

(57) ABSTRACT

A prepreg, which includes a carbon fiber reinforced material, has excellent Mode I interlaminar toughness, Mode II interlaminar toughness, and tensile strength. The prepreg includes the following constituents [A] to [C] and satisfies the following conditions (I) and (II):
[A]: a carbon fiber;
[B]: an epoxy resin; and
[C]: a hardener for [B], and
(I) a surface oxygen concentration O/C of [A] measured by X-ray photoelectron spectroscopy is 0.10 or more; and
(II) a cured product obtained by curing [B] and [C] includes a resin region having molecular anisotropy exhibiting interference fringes in polarizing microscope observation in a crossed Nicol state.

8 Claims, 1 Drawing Sheet

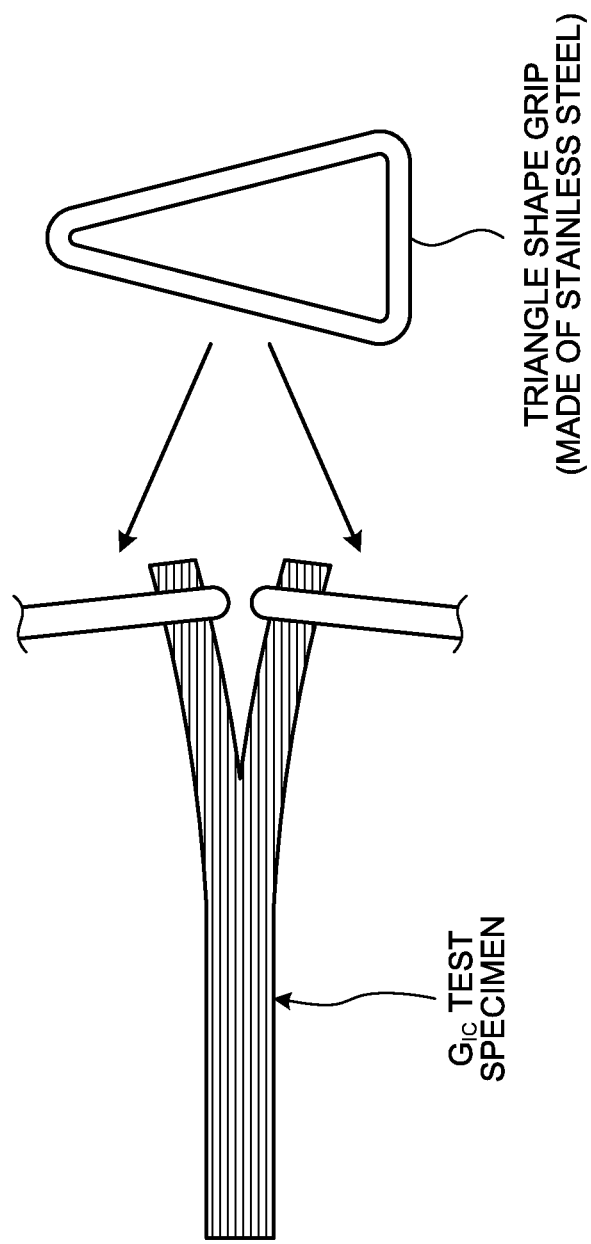

PREPREG AND CARBON FIBER REINFORCED MATERIAL

FIELD

The present invention relates to a prepreg providing a carbon fiber reinforced material having both excellent interlaminar toughness and tensile strength and the carbon fiber reinforced material.

BACKGROUND

Conventionally, a fiber reinforced material made of a reinforced fiber such as a carbon fiber and a glass fiber and a thermosetting resin such as an epoxy resin and a phenol resin has excellent mechanical properties such as strength and stiffness, heat resistance, and corrosion resistance in addition to light weight and thus has been applied for various fields such as an aerospace field, an automotive field, a railway car field, a ship and vessel field, a civil engineering and construction field, and a sporting goods field. In particular, in applications requiring high performance, a fiber reinforced material using a continuous reinforced fiber has been used and a carbon fiber, which has excellent specific strength and specific elastic modulus, has been mainly used as the reinforced fiber and a thermosetting resin, in particular an epoxy resin, which has excellent adhesiveness to the carbon fiber, has been mainly used as a matrix resin.

The carbon fiber reinforced material is a nonuniform material including the reinforced fiber and the matrix resin as essential constituents and has significant difference between physical properties in an arrangement direction of the reinforced fiber and physical properties in other directions. For example, it has been known that the interlaminar toughness exhibiting difficulty in progress of the interlaminar fracture of the reinforced fiber is failed to be fundamentally improved by only improving the strength of the reinforced fiber. In particular, the carbon fiber reinforced material including the thermosetting resin as the matrix resin has characteristics that the carbon fiber reinforced material is easily fractured by the stress from a direction other than the arrangement direction of the reinforced fiber due to the low toughness of the matrix resin. Therefore, for the application requiring high strength and reliability such as a constructional material of an aircraft, various techniques have been developed in order to improve the physical properties of the composite material including the interlaminar toughness that can endure the stress from the direction other than the arrangement direction of the reinforced fiber while securing the strength in the fiber direction.

In recent years, in addition to an increase in the application sites of the carbon fiber reinforced material to the constructional material of an aircraft, the application of the carbon fiber reinforced material to wind turbine blades and various turbines aiming to improve power generation efficiency or energy conversion efficiency has been progressed. The study of application to a thick member and a member having a three-dimensional curved surface shape has been progressed. In the case where tensile or compression stress is applied to such a thick member or the member having a curved surface shape, peeling stress between prepreg interlayers in out-of-plane directions of the surface is generated. This stress generates a crack between layers by a crack opening mode and thus the strength and the stiffness of the entire member deteriorate due to the progress of this crack. Consequently, the entire member may be fractured. In order to resist this peeling stress, the interlaminar toughness in the crack opening mode, that is, Mode I is required. In order to obtain the carbon fiber reinforced material having high Mode I interlaminar toughness, the matrix resin is required to have high toughness. In order to improve the toughness of the matrix resin, a method for blending a rubber component into a matrix resin (for example, refer to Patent Literature 1) and a method for blending a thermoplastic resin into a matrix resin (for example, refer to Patent Literature 2) have been known. In addition, a method for inserting a kind of adhesion layer or an impact absorption layer called an interleaf between the layers (for example, refer to Patent Literature 3) and a method for strengthening the interlayer with particles (for example, refer to Patent Literature 4) have been developed.

CITATION LIST

Patent Literature

Patent Literature 1: Japanese Patent Application Laid-open No. 2001-139662

Patent Literature 2: Japanese Patent Application Laid-open No. H7-278412

Patent Literature 3: Japanese Patent Application Laid-open No. S60-231738

Patent Literature 4: Japanese Patent Application Laid-open No. H6-94515

SUMMARY

Technical Problem

However, the methods described in Patent Literature 1 and Patent Literature 2 provide an insufficient toughness improvement effect of the matrix resin. The methods described in Patent Literature 3 and Patent Literature 4 provide an effect for Mode II interlaminar toughness. However, these methods provide insufficient effect for Mode I interlaminar toughness. These methods are methods for providing high toughness to the matrix resin in order to obtain the carbon fiber reinforced material having high interlaminar toughness. Therefore, these Patent Literatures have not described methods for improving the interlaminar toughness by noticing the surface element ratio of the reinforced fiber used in combination with the matrix resin and interface adhesion property between the matrix resin and the reinforced fiber at all.

Therefore, an object of the present invention is to provide a prepreg that provides a carbon fiber reinforced material having excellent Mode I interlaminar toughness, Mode II interlaminar toughness, and tensile strength and the carbon fiber reinforced material.

Solution to Problem

The present invention employs the following means in order to solve such problems.

A prepreg according to the present invention includes following constituents [A] to [C] and satisfies following conditions (I) and (II):

[A]: a carbon fiber;
[B]: an epoxy resin; and
[C]: a hardener for [B], and
(I) a surface oxygen concentration O/C of [A] measured by X-ray photoelectron spectroscopy is 0.10 or more; and (II) a cured product obtained by curing [B] and [C] includes a resin region having molecular anisotropy exhibiting interference fringes in polarizing microscope observation in a crossed Nicol state.

A carbon fiber reinforced material according to the present invention includes a following constituent [A] and a cured product of following constituents [B] and [C] and satisfies following conditions (I) and (II):

[A]: a carbon fiber;
[B]: an epoxy resin; and
[C]: a hardener for [B], and (I) a surface oxygen concentration O/C of [A] measured by X-ray photoelectron spectroscopy is 0.10 or more; and (II) a cured product obtained by curing [B] and [C] includes a resin region having molecular anisotropy exhibiting interference fringes in polarizing microscope observation in a crossed Nicol state.

Advantageous Effects of Invention

According to the present invention, the carbon fiber reinforced material having excellent Mode I interlaminar toughness, Mode II interlaminar toughness, and tensile strength is obtained.

BRIEF DESCRIPTION OF DRAWING

FIG. 1 is a view illustrating the measurement method of Mode I interlaminar toughness ($G_{IC}$).

DESCRIPTION OF EMBODIMENTS

The carbon fiber serving as the constituent [A] of the present invention is not limited by the form or arrangement of the fiber. For example, a long fiber arranged in one direction and fiber structure products such as a single tow, a fabric, a woven fabric, and a braid are used. The carbon fiber may be used by combining two or more types of carbon fibers or used in combination with other reinforced fiber such as a glass fiber, an aramid fiber, a boron fiber, a PBO fiber, a high strength polyethylene fiber, an alumina fiber, and a silicon carbide fiber.

Specific examples of the carbon fiber include an acrylic carbon fiber, a pitch-based carbon fiber, and a rayon carbon fiber. In particular, the acrylic carbon fiber having high tensile strength is preferably used.

Such an acrylic carbon fiber can be produce through, for example, the process described below. A spinning dope solution including polyacrylonitrile obtained from a monomer containing acrylonitrile as a main component is spun by a wet spinning method, a dry-jet wet spinning method, a dry spinning method, or a melt spinning method. A precursor is formed from a coagulated fiber after the spinning through a spinning process. Subsequently, the precursor is subjected to the process for providing flame resistance and carbonizing to give the carbon fiber.

As the form of the carbon fiber, a twisted yarn, an untwisted yarn, a non-twisted yarn, or the like may be used. In the case of the twisted yarn, the orientation of filaments constituting the carbon fiber is not parallel and thus this orientation causes reduction in the mechanical properties of the obtained carbon fiber reinforced material. Therefore, the untwisted yarn or the non-twisted yarn having good balance between the moldability and strength property of the carbon fiber reinforced material is preferably used.

In order to improve adhesiveness to the matrix resin, usually, the carbon fiber according to the present invention is preferably subjected to oxidation treatment to introduce oxygen containing functional groups. As the method of oxidation treatment, gas phase oxidation, liquid phase oxidation, and liquid phase electrochemical oxidation are used. The liquid phase electrochemical oxidation is preferably used from the viewpoints of high productivity and uniform treatment.

In the present invention, examples of the electrolytic solution used in the liquid phase electrochemical oxidation include an acidic electrolytic solution and an alkaline electrolytic solution. From the viewpoint of adhesiveness, it is more preferable that the carbon fiber be subjected to the liquid phase electrochemical oxidation in the alkaline electrolytic solution and thereafter a sizing agent be applied to the oxidized carbon fiber.

Examples of the acidic electrolytic solution include inorganic acids such as sulfuric acid, nitric acid, hydrochloric acid, phosphoric acid, boric acid, and carbonic acid; organic acids such as acetic acid, butyric acid, oxalic acid, acrylic acid, and maleic acid; and salts such as ammonium sulfate and ammonium hydrogen sulfate. Of these compounds, sulfuric acid and nitric acid, which indicate strong acidity, are preferably used.

Specific examples of the alkaline electrolytic solution include the aqueous solutions of hydroxides such as sodium hydroxide, potassium hydroxide, magnesium hydroxide, calcium hydroxide, and barium hydroxide; the aqueous solutions of carbonate salts such as sodium carbonate, potassium carbonate, magnesium carbonate, calcium carbonate, barium carbonate, and ammonium carbonate; the aqueous solutions of hydrogen carbonate salts such as sodium hydrogen carbonate, potassium hydrogen carbonate, magnesium hydrogen carbonate, calcium hydrogen carbonate, barium hydrogen carbonate, and ammonium hydrogen carbonate; and the aqueous solutions of ammonia, tetraalkylammonium hydroxide, and hydrazine. Of these compounds, the aqueous solutions of ammonium carbonate and ammonium hydrogen carbonate or an aqueous solution of tetraalkylammonium hydroxide, which indicates strong alkaline, is preferably used from the viewpoint of not including alkali metals that induce curing inhibition of the matrix resin.

The concentration of the electrolytic solution used in the present invention is preferably in the range of 0.01 mol/liter to 5 mol/liter and more preferably in the range of 0.1 mol/liter to 1 mol/liter. The electrolytic solution having a concentration of 0.01 mol/liter or more allows electrochemical treatment voltage to be reduced and thus is advantageous in operation cost. On the other hand, the electrolytic solution having a concentration of 5 mol/liter or less is advantageous from the viewpoint of safety.

The temperature of the electrolytic solution used in the present invention is preferably in the range of 10° C. to 100° C. and more preferably in the range of 10° C. to 40° C. The electrolytic solution at a temperature of 10° C. or more allows the effect of the electrochemical treatment to be improved and thus is advantageous in operation cost. On the other hand, the electrolytic solution at a temperature of 100° C. or less is advantageous from the viewpoint of safety.

In the present invention, electric quantity in the liquid phase electrochemical oxidation is preferably optimized in accordance with the degree of carbonization of the carbon fiber. In the case where the carbon fiber having high modulus is treated, larger electric quantity is required.

In the present invention, the electric current density in the liquid phase electrochemical oxidation is preferably in the range of 1.5 ampere/m$^2$ to 1,000 ampere/m$^2$ and more preferably in the range of 3 ampere/m² to 500 ampere/m² per square meter of the surface area of the carbon fiber in the electrochemical treatment solution. The liquid phase electrochemical oxidation in an electric current density of 1.5 ampere/m² or more allows efficiency of the electrochemical treatment to be improved and thus is advantageous in operation cost. On the other hand, the liquid phase electrochemical oxidation in an electric current density of 1,000 ampere/m² or less is advantageous from the viewpoint of safety.

In the present invention, the total amount of the electrochemical electric quantity employed in the electrochemical treatment is preferably 3 coulombs/g to 300 coulombs/g per gram of the carbon fiber. The electrochemical treatment using a total amount of the electrochemical electric quantity of 3 coulombs/g or more allows the functional groups to be sufficiently provided onto the carbon fiber surface and interface adhesion property between the matrix resin and the carbon fiber to be excellent. On the other hand, the electrochemical treatment using a total amount of the electrochemical electric quantity of 300 coulombs/g or less allows the flaw expansion in the single fiber surface of the carbon fiber to be reduced and strength deterioration in the carbon fiber to be reduced.

In the present invention, after the electrochemical treatment, the carbon fiber is preferably washed with water and dried. As the method of washing, for example, a dipping method and a spraying method can be used. Of these methods, the dipping method is preferably used from the viewpoint of easy washing. Use of the dipping method while shaking the carbon fiber with ultrasonic waves is a preferable aspect. Excessively high drying temperature causes easy disappearance of the functional groups existing at the outermost surface of the carbon fiber by thermal degradation and thus drying is desirably carried out at a temperature as low as possible. Specifically, the drying is carried out preferably at a drying temperature of 250° C. or less and further preferably 210° C. or less.

The carbon fiber used in the present invention preferably has a Young's modulus in the range of 200 GPa to 440 GPa. Young's modulus of the carbon fiber is affected by crystallinity of a graphite structure constituting the carbon fiber. As the crystallinity becomes higher, the modulus becomes higher. Young's modulus of the carbon fiber in this range allows all of the stiffness and strength of the carbon fiber reinforced material to be balanced on a high level, which is preferable. More preferable Young's modulus is in the range of 230 GPa to 400 GPa and further preferable Young's modulus is in the range of 260 GPa to 370 GPa. Here, Young's modulus of the carbon fiber is a value measured in accordance with JIS R7601 (2006).

Examples of the commercially available products of the carbon fiber include "torayca (registered trademark)" T800G-24K, "torayca (registered trademark)" T300-3K, "torayca (registered trademark)" T700G-12K, and "torayca (registered trademark)" T1100G-24K (all products are manufactured by Toray Industries, Inc.).

The carbon fiber used in the present invention preferably has a single fiber fineness of 0.2 dtex to 2.0 dtex and more preferably 0.4 dtex to 1.8 dtex. The carbon fiber having a single fiber fineness of less than 0.2 dtex may easily cause damage of the carbon fiber due to contact with a guide roller at the time of twisting. In addition, a similar damage may be caused at the impregnation treatment process of the resin composition. The carbon fiber having a single fiber fineness of more than 2.0 dtex may fail to sufficiently impregnate the carbon fiber with the resin composition and consequently fatigue resistance may deteriorate.

The carbon fiber used in the present invention preferably has a number of filaments in one fiber bundle in the range of 2,500 to 50,000. The fiber bundle having a number of filaments of less than 2,500 easily causes the meandering of the fiber arrangement. This tends to cause strength deterioration. The fiber bundle having a number of filaments of more than 50,000 may cause difficulty in resin impregnation at the time of prepreg preparation or at the time of molding. The number of filaments is preferably in the range of 2,800 to 40,000.

In the present invention, the surface oxygen concentration (O/C) of the carbon fiber, which is a ratio of the numbers of atoms of oxygen (O) and carbon (C) at the fiber surface of the carbon fiber measured by X-ray photoelectron spectroscopy, is 0.10 or more. The carbon fiber having the surface oxygen concentration in the range of 0.10 to 0.50 is preferable, in the range of 0.14 to 0.30 is more preferable, and in the range of 0.14 to 0.20 is further preferable. The carbon fiber having a surface oxygen concentration (O/C) of 0.10 or more allows the oxygen containing functional groups at the carbon fiber surface to be secured and strong adhesion to the matrix resin to be obtained. The carbon fiber having a surface oxygen concentration (O/C) of 0.50 or less allows deterioration in strength of the carbon fiber itself due to oxidation to be reduced, which is preferable.

The surface oxygen concentration (O/C) of the carbon fiber can be determined by the X-ray photoelectron spectroscopy in accordance with the following procedure. First, the carbon fiber from which contamination and the like attached to the carbon fiber surface are removed with a solvent is cut into a length of 20 mm and is spread and arranged on the sample support stage made of copper. Thereafter the sample is measured at a photoelectron takeoff angle of 90° using $AlK_{\alpha 1,2}$ as an X-ray source while maintaining at $1 \times 10^{-8}$ Torr in a sample chamber. The binding energy value of the main peak (top peak) of $C_{1s}$ is adjusted to 284.6 eV as the correction value of the peak associated with electrostatic charge during the measurement. The peak area of $C_{1s}$ is determined by drawing a linear base line in the range of 282 eV to 296 eV, while the peak area of $O_{1s}$ is determined by drawing a linear base line in the range of 528 eV to 540 eV. The surface oxygen concentration (O/C) is represented by an atom number ratio calculated by dividing the ratio of the $O_{1s}$ peak area and the $C_{1s}$ peak area by the apparatus-specific sensitivity correction value. In the case where ESCA-1600 manufactured by ULVAC-PHI, Inc. is used as the X-ray photoelectron spectroscopy apparatus, the apparatus-specific sensitivity correction value is 2.33.

The carbon fiber according to the present invention is preferably a sizing agent-coated carbon fiber. Use of the sizing agent-coated carbon fiber provides excellent handleability of the carbon fiber and excellent interface adhesion property between the carbon fiber and the matrix resin and thus the sizing agent-coated carbon fiber is suitable for the carbon fiber reinforced material application.

In the present invention, the sizing agent preferably includes an epoxy resin compound. Examples of the epoxy compound included in the sizing agent include an aliphatic epoxy compound and an aromatic epoxy compound. These compounds may be used singly or in combination.

The carbon fiber prepared by applying the sizing agent made of the aliphatic epoxy compound alone is confirmed to have high adhesiveness to the matrix resin. The mechanism of this phenomenon is not clear. However, it is considered that the aliphatic epoxy compound can form strong interaction between the functional groups such as carboxyl group and hydroxyl group on the carbon fiber surface and the aliphatic epoxy compound due to a flexible molecular skeleton and a structure having a high degree of freedom.

The carbon fiber prepared by applying the sizing agent made of the aromatic epoxy compound alone has advantages that the activity of the sizing agent with the matrix resin is low and physical property change is small when the prepreg is stored for a long period of time. This carbon fiber also has an advantage that a rigid interface layer can be formed.

In the case where the sizing agent prepared by mixing the aliphatic epoxy compound and the aromatic epoxy compound, a phenomenon in which more aliphatic epoxy compound, which has higher polarity, is localized on the carbon fiber side and the aromatic epoxy compound, which has lower polarity, is localized on the outermost layer of the sizing layer opposite to the carbon fiber can be observed. As a result of the gradient structure of the sizing layer, the aliphatic epoxy compound has strong interaction with the carbon fiber in the vicinity of the carbon fiber and thus the adhesiveness between the carbon fiber and the matrix resin can be improved. The aromatic epoxy compound at a high content existing on the outer layer acts as shielding the aliphatic epoxy compound from the matrix resin in the case where the sizing agent-coated carbon fiber is used in the prepreg. This allows the reaction of the aliphatic epoxy compound with highly reactive components in the matrix resin to be inhibited and thus the stability at the time of storage for a long period of time can be achieved.

Specific examples of the aliphatic epoxy compound include glycidyl ether epoxy compounds derived from polyols, glycidyl amine epoxy compounds derived from amines having a plurality of active hydrogens, glycidyl ester epoxy compounds derived from polycarboxylic acids, and epoxy compounds obtained by oxidizing compounds having a plurality of double bonds in the molecule.

Examples of the glycidyl ether epoxy compounds include glycidyl ether epoxy compounds obtained by the reaction with epichlorohydrin. As the glycidyl ether epoxy compounds, glycidyl ether epoxy compounds obtained by the reaction of epichlorohydrin with ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, hydrogenated bisphenol A, hydrogenated bisphenol F, glycerol, diglycerol, polyglycerol, trimethylolpropane, pentaerythritol, sorbitol, and arabitol may be exemplified. In addition, as the glycidyl ether epoxy compounds, glycidyl ether epoxy compounds having a dicyclopentadiene skeleton are also exemplified.

Examples of the glycidyl amine epoxy compounds include 1,3-bis(diglycidylaminomethyl)cyclohexane.

Examples of the glycidyl ester epoxy compounds include glycidyl ester epoxy compounds obtained by reacting dimer acids with epichlorohydrin.

Examples of the epoxy compounds obtained by oxidizing compounds having a plurality of double bonds in the molecule include epoxy compounds having an epoxycyclohexane ring in the molecule. In addition, examples of these epoxy compounds include epoxidized soybean oils.

Other than these epoxy compounds, examples of the aliphatic epoxy compounds include epoxy compounds such as triglycidyl isocyanurate.

Of the above-described compounds, polyether polyepoxy compounds and/or polyol polyepoxy compounds having two or more of epoxy groups in the molecule are preferable from the viewpoint of high adhesiveness.

The aliphatic epoxy compound preferably contains one or more epoxy groups and one or more functional groups selected from a hydroxyl group, an amide group, an imide group, a urethane group, a urea group, a sulfonyl group, a carboxyl group, an ester group, and a sulfo group. Specific examples of the aliphatic epoxy compound include a compound having an epoxy group and a hydroxyl group, a compound having an epoxy group and an amide group, a compound having an epoxy group and an imide group, a compound having an epoxy group and a urethane group, a compound having an epoxy group and a urea group, a compound having an epoxy group and a sulfonyl group, and a compound having an epoxy group and a sulfo group.

Examples of the compound having a hydroxyl group in addition to an epoxy group include sorbitol polyglycidyl ether and glycerol polyglycidyl ether. Specific examples include "DENACOL (registered trademark)" EX-611, EX-612, EX-614, EX-614B, EX-622, EX-512, EX-521, EX-421, EX-313, EX-314, and EX-321 (all products are manufactured by Nagase ChemteX Corporation).

Examples of the compound having an amide group in addition to an epoxy group include an amide-modified epoxy compound. The amide-modified epoxy compound can be obtained by reacting the carboxyl group of an aliphatic dicarboxylic acid amide with the epoxy group of an epoxy compound having two or more epoxy groups.

Examples of the compound having a urethane group in addition to an epoxy group include a urethane-modified epoxy compound. Specific examples include "ADEKA RESIN (registered trademark)" EPU-78-135, EPU-6, EPU-11, EPU-15, EPU-16A, EPU-16N, EPU-17T-6, EPU-1348, and EPU-1395 (all products are manufactured by ADEKA CORPORATION). Alternatively, a compound having an epoxy group and a urethane group can be obtained by reacting a terminal hydroxyl group of polyethylene oxide monoalkyl ether with polyvalent isocyanate having a reaction equivalent to the amount of the hydroxyl group and subsequently reacting the isocyanate residue of the obtained reaction product with the hydroxyl group in the polyvalent epoxy compound. Here, examples of the polyvalent isocyanate to be used include hexamethylene diisocyanate, isophorone diisocyanate, and norbornane diisocyanate.

Examples of the compound having a urea group in addition to an epoxy group include a urea-modified epoxy compound. The urea-modified epoxy compound can be obtained by reacting the epoxy group of the epoxy compound having two or more epoxy groups with the carboxyl group of an aliphatic dicarboxylic acid urea.

Of the above-described compounds, the aliphatic epoxy compound is more preferably the glycidyl ether epoxy compound obtained by reacting epichlorohydrin with ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, glycerol, diglycerol, polyglycerol, trimethylolpropane, pentaerythritol, sorbitol, and arabitol and polyglycerol polyglycidyl ether is further preferable from the viewpoint of high adhesiveness.

The aromatic epoxy compound has one or more aromatic rings in the molecule. The aromatic ring may be an aromatic ring of hydrocarbon made of carbon alone or may be an aromatic heterocyclic ring such as furan, thiophene, pyrrole, and imidazole containing a hetero atom such as nitrogen or oxygen. The aromatic ring may be a polycyclic aromatic ring such as naphthalene and anthracene. In the fiber reinforced material made of the sizing agent-coated carbon fiber and the matrix resin, what is called an interface layer in the vicinity of the carbon fiber may be affected by the carbon fiber or the sizing agent and may have different properties from the matrix resin. The epoxy compound containing one or more aromatic rings forms the rigid interface layer. Therefore, stress transfer ability between the carbon fiber and the matrix resin is improved and mechanical properties such as 0° tensile strength of the fiber reinforced material are improved. Improvement in hydrophobicity due to the aromatic ring results in weakening the interaction to the carbon fiber compared with the aliphatic epoxy compound. Therefore, the aromatic epoxy compound can cover the aliphatic epoxy compound and this allows the aromatic epoxy compound to exist on the outer layer of the sizing layer. This allows the change over time during storage for a long period of time to be inhibited in the case where the sizing agent-coated carbon fiber including the aromatic epoxy compound is used for the prepreg, which is preferable. The aromatic epoxy compound having two or more aromatic rings is preferable because the stability for a long period of time due to the aromatic rings is improved. The upper limit of the number of the aromatic rings is not particularly limited. Ten rings are sufficient from the viewpoints of the mechanical properties and the inhibition of the reaction with the matrix resin.

The aromatic epoxy compound has at least one or more epoxy groups and one or more aromatic rings in the molecule. The aromatic epoxy compound preferably contains at least one or more functional groups selected from a hydroxyl group, an amide group, an imide group, a urethane group, a urea group, a sulfonyl group, a carboxyl group, an ester group, and a sulfo group in addition to the epoxy group. The aromatic epoxy compound may contain two or more functional groups in addition to the epoxy group in one molecule. As the sizing agent, an aromatic ester compound and an aromatic urethane compound are preferably used in addition to the aromatic epoxy compound because these compounds improve the stability of the compound and high-order processability.

The number of the epoxy groups in the molecule of the aromatic epoxy compound is preferably two or more and more preferably three or more. In addition, the number is preferably 10 or less.

The aromatic epoxy compound is preferably an epoxy compound having three or more functional groups of two or more kinds and more preferably an epoxy compound having four or more functional groups of two or more kinds. The functional groups contained in the epoxy compound are preferably functional groups selected from a hydroxyl group, an amide group, an imide group, a urethane group, a urea group, a sulfonyl group, and a sulfo group in addition to the epoxy group. Even when one epoxy group forms covalent bond with the oxygen containing functional group of the carbon fiber surface, the epoxy compound having three or more epoxy groups or other functional groups in the molecule can form covalent bond or hydrogen-binding of the remaining two or more epoxy groups or other functional groups with the matrix resin. Consequently, the adhesiveness is further improved. The upper limit of the number of the functional groups including the epoxy groups is not particularly limited. Ten groups are sufficient from the viewpoint of the adhesiveness.

Specific examples of the aromatic epoxy compound include glycidyl ether epoxy compounds derived from polyols, glycidyl amine epoxy compounds derived from amines having a plurality of active hydrogens, glycidyl ester epoxy compounds derived from polycarboxylic acids, and epoxy compounds obtained by oxidizing compounds having a plurality of double bonds in the molecule.

Examples of the glycidyl ether epoxy compounds include glycidyl ether epoxy compounds obtained by reacting epichlorohydrin with bisphenol A, bisphenol F, bisphenol AD, bisphenol S, tetrabromobisphenol A, phenol novolac, cresol novolac, hydroquinone, resorcinol, 4,4'-dihydroxy-3,3',5,5'-tetramethylbiphenyl, 1,6-dihydroxynaphthalene, 9,9'-bis(4-hydroxyphenyl)fluorene, tris(p-hydroxyphenyl)methane, and tetrakis(p-hydroxyphenyl)ethane. In addition, as the glycidyl ether epoxy, glycidyl ether epoxy compounds having a biphenylaralkyl skeleton are also exemplified.

Examples of the glycidyl amine epoxy compounds include N,N-diglycidylaniline, N,N-diglycidyl-o-toluidine, m-xylylenediamine, m-phenylenediamine, 4,4'-diaminodiphenylmethane, and 9,9-bis(4-aminophenyl)fluorene.

Additional examples of the glycidyl amine epoxy compounds include an epoxy compound obtained by reacting both hydroxyl group and amino group of aminophenols of m-aminophenol, p-aminophenol, and 4-amino-3-methylphenol with epichlorohydrin.

Examples of the glycidyl ester epoxy compounds include glycidyl ester epoxy compounds obtained by reacting, for example, phthalic acid, terephthalic acid, or hexahydrophthalic acid with epichlorohydrin.

In addition to these epoxy compounds, examples of the aromatic epoxy compound used in the present invention include epoxy compounds synthesized by using the above-described epoxy compounds as raw materials, for example, an epoxy compound synthesized by the reaction of forming an oxazolidone ring from bisphenol A diglycidyl ether and tolylene diisocyanate.

As the aromatic epoxy compound, an aromatic epoxy compound containing at least one or more functional groups selected from a hydroxyl group, an amide group, an imide group, a urethane group, a urea group, a sulfonyl group, a carboxyl group, an ester group, and a sulfo group in addition to one or more epoxy groups is preferably used. Examples include a compound having an epoxy group and a hydroxyl group, a compound having an epoxy group and an amide group, a compound having an epoxy group and an imide group, a compound having an epoxy group and a urethane group, a compound having an epoxy group and a urea group, a compound having an epoxy group and a sulfonyl group, and a compound having an epoxy group and a sulfo group.

Examples of the compound having an amide group in addition to an epoxy group include glycidylbenzamide and an amide-modified epoxy compound. The amide-modified epoxy compound can be obtained by reacting the carboxyl group of a dicarboxylic acid amide containing an aromatic ring with the epoxy group of the epoxy compound having two or more epoxy groups.

Examples of the compound having an imide group in addition to an epoxy group include glycidylphthalimide. Specific examples include "DENACOL (registered trademark)" EX-731 (manufactured by Nagase ChemteX Corporation).

The compound having a urethane group in addition to an epoxy group can be obtained by reacting the terminal hydroxyl group of polyethylene oxide monoalkyl ether with polyvalent isocyanate containing a reaction equivalent aromatic ring to the amount of the hydroxyl group and subsequently reacting the isocyanate residue of the obtained reaction product with the hydroxyl group in a polyvalent epoxy compound. Here, examples of the polyvalent isocyanate to be used include 2,4-tolylene diisocyanate, metaphenylene diisocyanate, para-phenylene diisocyanate, diphenylmethane diisocyanate, triphenylmethane triisocyanate, and biphenyl-2,4,4'-triisocyanate.

Examples of the compound having a urea group in addition to an epoxy group include a urea-modified epoxy compound. The urea-modified epoxy compound can be obtained by reacting the carboxyl group of a dicarboxylic acid urea containing an aromatic ring with the epoxy group of the epoxy compound having two or more epoxy groups.

Examples of the compound having a sulfonyl group in addition to an epoxy group include bisphenol S epoxy. Examples of the compound having a sulfo group in addition to an epoxy group include glycidyl p-toluenesulfonate and glycidyl 3-nitrobenzenesulfonate.

In the case where the aromatic epoxy compound is any of the phenol novolac epoxy compound, the cresol novolac epoxy compound, or tetraglycidyl diaminodiphenylmethane, these compounds are preferable from the viewpoints that these compounds have a large number of epoxy groups, low epoxy equivalent weight, and two or more aromatic rings, improve adhesiveness between the carbon fiber and the matrix resin, and improve mechanical properties such as 0° tensile strength of the carbon fiber reinforced material. The phenol novolac epoxy compound and the cresol novolac epoxy compound are more preferable.

In the case where the aromatic epoxy compound is any of the phenol novolac epoxy compound, a cresol novolac epoxy compound, tetraglycidyl diaminodiphenylmethane, the bisphenol A epoxy compound, or the bisphenol F epoxy compound, these compounds are preferable from the viewpoints of stability when the prepreg is stored for a long period of time and adhesiveness. The bisphenol A epoxy compound or the bisphenol F epoxy compound is more preferable.

In addition, the sizing agent used in the present invention may include one or more other components in addition to the aliphatic epoxy compound and the aromatic epoxy compound. Examples of the other components include an accelerator for improving the adhesiveness between the carbon fiber and the sizing agent and a component for improving a handleability, abrasion resistance, and fuzz resistance and improving the impregnating property of the matrix resin by providing the sizing agent-coated carbon fiber with a bundle forming property or flexibility. For the purpose of the stability of the sizing agent, auxiliary components such as a dispersing agent and a surfactant may be added.

In the present invention, the epoxy equivalent weight of the sizing agent applied to the carbon fiber is preferably 350 g/mol to 550 g/mol. The sizing agent having an epoxy equivalent weight of 550 g/mol or less allows the adhesiveness between the carbon fiber prepared by applying the sizing agent and the matrix resin to be improved, which is preferable. The sizing agent having an epoxy equivalent weight of 350 g/mol or more allows the reaction of the resin component used for the prepreg and the sizing agent to be inhibited in the case where the sizing agent-coated carbon fiber is used for the prepreg. Therefore, the physical properties of the obtained carbon fiber reinforced material are excellent even when the prepreg is stored for a long period of time, which is preferable. The epoxy equivalent weight of the carbon fiber to which the sizing agent in the present invention is applied can be determined by immersing the sizing agent-coated fiber into a solvent represented by N,N-dimethylformamide, eluting the sizing agent from the fiber by subjecting to ultrasonic cleaning, thereafter opening the ring of the epoxy group with hydrochloric acid, and carrying out acid-base titration. The epoxy equivalent weight is preferably 360 g/mol or more and more preferably 380 g/mol or more. The epoxy equivalent weight is also preferably 530 g/mol or less and more preferably 500 g/mol or less. The epoxy equivalent weight of the sizing agent applied to the carbon fiber can be controlled by, for example, the epoxy equivalent weight of the sizing agent used for the application and thermal history in drying after the application.

In the present invention, the attached amount of the sizing agent is preferably 0.1 part by mass or more, more preferably in the range of 0.1 part by mass to 3.0 parts by mass, and further preferably in the range of 0.2 part by mass to 3.0 parts by mass relative to the 100 parts by mass of the carbon fiber. The attached amount of the sizing agent in this range allows high shear toughness to be achieved. As a method for measuring the attached amount of the sizing agent, the attached amount is determined to be the mass percent of a value obtained by dividing a mass change amount before and after heat treatment by a mass before the heat treatment when 2±0.5 g of the sizing agent-coated carbon fiber is collected and subjected to the heat treatment at 450° C. for 15 minutes under a nitrogen atmosphere.

In the present invention, the attached amount of the sizing agent remaining on the carbon fiber after washing the sizing agent-coated carbon fiber is preferably 0.08% by mass or more, more preferably in the range of 0.08% by mass to 3.0% by mass, and further preferably in the range of 0.14% by mass to 0.30% by mass relative to the sizing agent-coated carbon fiber. The sizing agent-coated carbon fiber having the attached amount of the sizing agent after washing in this range allows the interfacial adhesion between the carbon fiber and the sizing agent to be excellent and high shear toughness to be achieved when the fiber reinforced material is prepared. In the present invention, the phrase "attached amount of the sizing agent remaining on the carbon fiber after washing the sizing agent-coated carbon fiber" refers to an amount measured and calculated as follows. To 10 ml of solution prepared by mixing acetonitrile and chloroform in a volume ratio of 9:1, 2±0.5 g of the sizing agent-coated carbon fiber is immersed and subjected to ultrasonic washing for 20 minutes to elute the sizing agent from the fiber. Thereafter, the carbon fiber is sufficiently dried and the mass is measured. Furthermore, the carbon fiber after washing is subjected to heat treatment at 450° C. for 15 minutes under a nitrogen atmosphere. The attached amount of the sizing agent after washing is determined as a mass percent of a value obtained by dividing a mass change amount before and after the heat treatment by a mass of the sizing agent-coated carbon fiber before the heat treatment.

In the prepreg according to the present invention, the interface shear strength (IFSS) defined by the following method is preferably 25 MPa or more, more preferably 30 MPa or more, and further preferably 40 MPa or more. As the interface shear strength becomes higher, the adhesiveness between the carbon fiber and the matrix resin tends to become higher. Here, the term "interface shear strength" in the present invention refers to interface shear strength between the single fiber of the carbon fiber and the bisphenol A epoxy resin and is a value measured and calculated as follows.

Hereinafter, the measurement method of the interface shear strength will be described. The measurement is carried out with reference to Drzal, L. T., Master, Sci, Eng. A126, 289 (1990).

More specifically, each 100 parts by mass of bisphenol A epoxy compound "jER (registered trademark)" 828 (manufactured by Mitsubishi Chemical Corporation) and 14.5 parts by mass of metaphenylenediamine (manufactured by Sigma-Aldrich Japan G. K.) is placed in a container. Thereafter, the compounds are heated at a temperature of 75° C. for 15 minutes in order to reduce the viscosity of the above-described jER 828 and to dissolve meta-phenylenediamine. Thereafter, both of the compounds are mixed sufficiently and the resultant mixture is subjected to vacuum defoaming at a temperature of 80° C. for about 15 minutes.

Subsequently, a single fiber is pulled out from the carbon fiber bundle and both edges of the single fiber are fixed in a dumbbell-shaped mold in a longitudinal direction in a state where constant tension is applied to the single fiber. Thereafter, in order to remove water attached to the carbon fiber and the mold, vacuum drying is carried out at a temperature of 80° C. for 30 minutes or more. The dumbbell-shaped mold is made of silicone rubber. The cast molding part has the shape of a center part width of 5 mm, a length of 25 mm, both edge part width of 10 mm, and an entire length of 150 mm.

The prepared resin is poured into the above-described mold after the vacuum drying. The temperature is raised to 75° C. at a temperature ramp rate of 1.5° C./min, retained for 2 hours, thereafter raised to 125° C. at a temperature ramp rate of 1.5° C./min, retained for 2 hours, and thereafter lowered to 30° C. at a temperature lowering rate of 2.5° C./min. Thereafter, the molded resin is removed from the mold to give a test specimen.

Tensile tension is applied to the test specimen obtained by the above-described procedure in a fiber axis direction (longitudinal direction) at a strain rate of 0.3%/second to generate a strain of 12%. Thereafter, the number of fiber breaks N (breaks) in the center part of the test specimen in a range of 22 mm is measured with a polarizing microscope. Subsequently, an average broken fiber length la is calculated in accordance with the formula la (μm)=22×1,000 (μm)/N (breaks). Subsequently, critical fiber length lc is calculated from the average broken fiber length la in accordance with the formula lc (μm)=(4/3)×la (μm). The strand tensile strength σ and the diameter d of the single fiber of the carbon fiber are further measured and the value calculated in accordance with the following formula is determined to be the "interface shear strength" in the present invention.

Interface shear strength IFSS(MPa)=σ(MPa)×$d$(μm)/ (2×$lc$)(μm).

Subsequently, the epoxy resin serving as the constituent [B] of the present invention will be described. The epoxy resin serving as the constituent [B] is preferably what is called a liquid crystalline epoxy resin that has a mesogenic structure and exhibits liquid crystallinity due to the high-order structure of the resin composition in the carbon fiber reinforced material in the present invention. The liquid crystallinity may be exhibited by the constituent [B] alone or may be exhibited by combining with a hardener serving as the constituent [C] described below and other components. The constituents [B] and [C] having the mesogenic structure (for example, a biphenyl group, a terphenyl group, terphenyl analogue groups, an anthracene group, and groups linked with an azomethine group or an ester group) provides the formation of the high-order structure (also referred to as a periodic structure) derived from the mesogenic structure.

In the case where the constituent [B] has the mesogenic structure, the epoxy resin having a structure represented by the following general formula (1) is preferable.

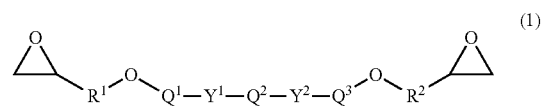

In the general formula (1), $Q^1$, $Q^2$, and $Q^3$ each include one structure selected from a group (I). $R^1$ and $R^2$ in the general formula (1) each represent an alkylene group having a carbon number of 1 to 6. Z in the group (I) each independently represents an aliphatic hydrocarbon group having a carbon number of 1 to 8, an aliphatic alkoxy group having a carbon number of 1 to 8, a fluorine atom, a chlorine atom, a bromine atom, an iodine atom, a cyano group, a nitro group, or an acetyl group. n each independently represents an integer of 0 to 4. $Y^2$, $Y^2$, and $Y^3$ each in the general formula (1) and the group (I) represent a linking group formed of at least one divalent group or single bond selected from a group (II).

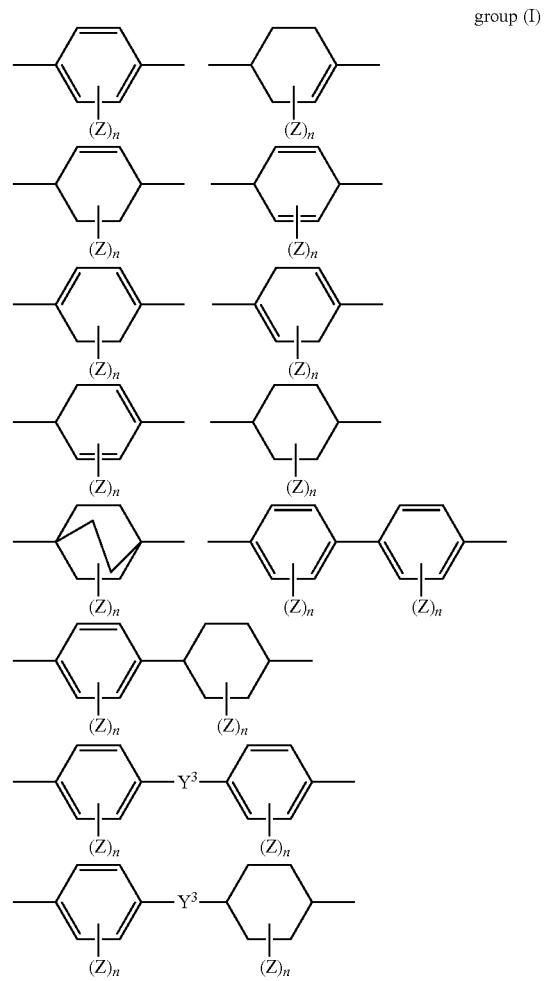

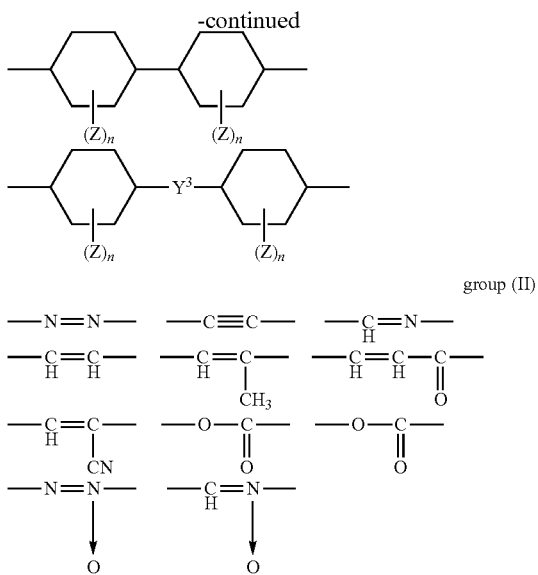

group (II)

Z in the group (I) each is independently preferably an aliphatic hydrocarbon group having a carbon number of 1 to 4, an aliphatic alkoxy group having a carbon number of 1 to 4, a fluorine atom, a chlorine atom, a bromine atom, an iodine atom, a cyano group, a nitro group, or an acetyl group, more preferably a methyl group, an ethyl group, a methoxy group, an ethoxy group, or a chlorine atom, and further preferably a methyl group or an ethyl group. n in the group (I) each is independently preferably an integer of 0 to 2 and more preferably 0 or 1.

As the amount of the mesogenic structure in the constituent [B] becomes more, the resin more easily forms the high-order structure after curing. However, the excessive mesogenic structure results in high softening point and deterioration in the handleability. Therefore, the number of the mesogenic structures in the general formula (1) is particularly preferably two. That the number of the mesogenic structures is two refers to a state where three of the ring structures such as benzene rings and cyclohexane rings are included and each of the ring structures is bonded through a linking group or a single bond of the group (II). Here, the softening point in the present invention refers to a temperature when the temperature of the sample poured in a ring is raised in a bath and the ball set to the sample intersects an optical sensor in accordance with the ring and boll method defined by JIS K7234 (1986).

$Q^1$, $Q^2$, and $Q^3$ in the general formula (1) including benzene rings provide a rigid structure of the constituent [B]. This allows the high-order structure to be easily formed and is advantageous for toughness improvement, which is preferable. $Q^1$, $Q^2$, and $Q^3$ in the general formula (1) including alicyclic hydrocarbon cause reduction in the softening point and thus the handleability is improved. Therefore, this is also a preferable aspect. The epoxy resin serving as the constituent [B] may be used singly or in combination of two or more of the epoxy resins.

The constituent [B] can be produced by the known methods. The production method described in, for example, Japanese Patent No. 4,619,770, Japanese Patent Application Laid-open No. 2010-241797, Japanese Patent Application Laid-open No. 2011-98952, Japanese Patent Application Laid-open No. 2011-74366, and Journal of Polymer Science: Part A: Polymer Chemistry, Vol. 42, 3631 (2004) can be referred.

Specific examples of the constituent [B] include 1,4-bis{4-(oxiranylmethoxy)phenyl}cyclohexane, 1-{3-methyl-4-(oxiranylmethoxy)phenyl}-4-{4-(oxiranylmethoxy)phenyl}cyclohexane, 1,4-bis{4-(oxiranylmethoxy)phenyl}-1-cyclohexene, 1-{3-methyl-4-(oxiranylmethoxy)phenyl}-4-{4-(oxiranylmethoxy)phenyl}-1-cyclohexene, 1-{2-methyl-4-(oxiranylmethoxy)phenyl}-4-{4-(oxiranylmethoxy)phenyl}-1-cyclohexene, 1-{3-ethyl-4-(oxiranylmethoxy)phenyl}-4-{4-(oxiranylmethoxy)phenyl}-1-cyclohexene, 1-{2-ethyl-4-(oxiranylmethoxy)phenyl}-4-{4-(oxiranylmethoxy)phenyl}-1-cyclohexene, 1-{3-n-propyl-4-(oxiranylmethoxy)phenyl}-4-{4-(oxiranylmethoxy)phenyl}-1-cyclohexene, 1-{3-isopropyl-4-(oxiranylmethoxy)phenyl}-4-{4-(oxiranylmethoxy)phenyl}-1-cyclohexene, 1,4-bis{4-(oxiranylmethoxy)phenyl}-2-cyclohexene, 1-{3-methyl-4-(oxiranylmethoxy)phenyl}-4-{4-(oxiranylmethoxy)phenyl)-2-cyclohexene, 1,4-bis{4-(oxiranylmethoxy)phenyl}-2,5-cyclohexadiene, 1-{3-methyl-4-(oxiranylmethoxy)phenyl}-4-{4-(oxiranylmethoxy)phenyl}-2,5-cyclohexadiene, 1,4-bis{4-(oxiranylmethoxy)phenyl}-1,5-cyclohexadiene, 1-{3-methyl-4-(oxiranylmethoxy)phenyl}-4-{4-(oxiranylmethoxy)phenyl}-1,5-cyclohexadiene, 1,4-bis{4-(oxiranylmethoxy)phenyl}-1,4-cyclohexadiene, 1-{3-methyl-4-(oxiranylmethoxy)phenyl}-4-{4-(oxiranylmethoxy)phenyl}-1,4-cyclohexadiene, 1,4-bis{4-(oxiranylmethoxy)phenyl}-1,3-cyclohexadiene, 1-{3-methyl-4-(oxiranylmethoxy)phenyl}-4-{4-(oxiranylmethoxy)phenyl}-1,3-cyclohexadiene, 1,4-bis{4-(oxiranylmethoxy)phenyl}benzene, 1-{3-methyl-4-(oxiranylmethoxy)phenyl}-4-{4-(oxiranylmethoxy)phenyl)benzene, 1,4-phenylene-bis{4-(2,3-epoxypropoxy)benzoate}, 1,4-phenylene-bis{4-(2,3-epoxypropoxy)-2-methylbenzoate}, 1,4-phenylene-bis{4-(2,3-epoxypropoxy)-3-methylbenzoate}, 1,4-phenylene-bis{4-(2,3-epoxypropoxy)-3,5-dimethylbenzoate}, 1,4-phenylene-bis{4-(2,3-epoxypropoxy)-2,6-dimethylbenzoate}, 2-methyl-1,4-phenylene-bis{4-(2,3-epoxypropoxy)benzoate}, 2-methoxy-1,4-phenylene-bis(4-hydroxybenzoate), 2-methyl-1,4-phenylene-bis{4-(2,3-epoxypropoxy)-2-methylbenzoate}, 2-methyl-1,4-phenylene-bis{4-(2,3-epoxypropoxy)-3-methylbenzoate}, 2-methyl-1,4-phenylene-bis{4-(2,3-epoxypropoxy)-3,5-dimethylbenzoate}, 2-methyl-1,4-phenylene-bis{4-(2,3-epoxypropoxy)-2,6-dimethylbenzoate}, 2,6-dimethyl-1,4-phenylene-bis{4-(2,3-epoxypropoxy)benzoate}, 2,6-dimethyl-1,4-phenylene-bis{4-(2,3-epoxypropoxy)-3-methylbenzoate}, 2,6-dimethyl-1,4-phenylene-bis{4-(2,3-epoxypropoxy)-3,5-dimethylbenzoate}, 2,3,6-trimethyl-1,4-phenylene-bis{4-(2,3-epoxypropoxy)benzoate}, 2,3,6-trimethyl-1,4-phenylene-bis{4-(2,3-epoxypropoxy)-2,6-dimethylbenzoate}, 2,3,5,6-tetramethyl-1,4-phenylene-bis{4-(2,3-epoxypropoxy) benzoate}, 2,3,5,6-tetramethyl-1,4-phenylene-bis{4-(2,3-epoxypropoxy)-3-methylbenzoate}, 2,3,5,6-tetramethyl-1,4-phenylene-bis{4-(2,3-epoxypropoxy)-3,5-dimethylbenzoate}, 2-methyl-1,4-phenylene-bis{4-(3-oxa-5,6-epoxyhexyloxy)benzoate}, 4-{4-(2,3-epoxypropoxy)phenyl}cyclohexyl-4-(2,3-epoxypropoxy)benzoate, 4-{4-(2,3-epoxypropoxy)phenyl}cyclohexyl-4-(2,3-epoxypropoxy)-2-methylbenzoate, 4-{4-(2,3-epoxypropoxy)phenyl}cyclohexyl-4-(2,3-epoxypropoxy)-3-methylbenzoate, 4-{4-(2,3-epoxypropoxy)phenyl}cyclohexyl-4-(2,3-epoxypropoxy)-3-ethylbenzoate, 4-{4-(2,3-epoxypropoxy)phenyl}cyclohexyl-4-(2,3-epoxypropoxy)-2-isopropylbenzoate, 4-{4-(2,3-epoxypropoxy)phenyl}cyclohexyl-4-(2,3-epoxypropoxy)-3,5-dimethylbenzoate, 1,4-bis{4-(3-oxa-5,6-epoxyhexyloxy)phenyl}-1-cyclohexene, 1-{4-(3-oxa-5,6-epoxyhexyloxy)-3-methylphenyl}-4-{4-(3-oxa-5,6-epoxyhexyloxy)phenyl}-1-cyclohexene, 1,4- bis{4-(5-methyl-3-oxa-5,6-epoxyhexyloxy)phenyl}-1-cyclohexene, 1-{4-(5-methyl-3-oxa-5,6-epoxyhexyloxy)-3-methylphenyl}-4-(4-(5-methyl-3-oxa-5,6-epoxyhexyloxy)phenyl}-1-cyclohexene, 1,4-bis{4-(4-methyl-4,5-epoxypentyloxy)phenyl}-1-cyclohexene, 1,4-bis{4-(3-oxa-5,6-epoxyhexyloxy)phenyl}benzene, 1-{4-(3-oxa-5,6-epoxyhexyloxy)-3-methylphenyl}-4-{4-(3-oxa-5,6-epoxyhexyloxy)phenyl}benzene, 1,4-bis{4-(5-methyl-3-oxa-5,6-epoxyhexyloxy)phenyl}benzene, 1-{4-(5-methyl-3-oxa-5,6-epoxyhexyloxy)-3-methylphenyl}-4-{4-(5-methyl-3-oxa-5,6-epoxyhexyloxy)phenyl}benzene, 1,4-bis{4-(4-methyl-4,5-epoxypentyloxy)phenyl}benzene, 1,4-bis{4-(3-oxa-5,6-epoxyhexyloxy)phenyl}cyclohexane, 1-{4-(3-oxa-5,6-epoxyhexyloxy)-3-methylphenyl}-4-{4-(3-oxa-5,6-epoxyhexyloxy)phenyl}cyclohexane, 1,4-bis{4-(5-methyl-3-oxa-5,6-epoxyhexyloxy)phenyl}cyclohexane, 1-{4-(5-methyl-3-oxa-5,6-epoxyhexyloxy)-3-methylphenyl}-4-{4-(5-methyl-3-oxa-5,6-epoxyhexyloxy)phenyl}cyclohexane, and 1,4-bis{4-(4-methyl-4,5-epoxypentyloxy)phenyl}cyclohexane. Of these compounds, 1-(3-methyl-4-oxiranylmethoxyphenyl)-4-(4-oxiranylmethoxyphenyl)-1-cyclohexene, 2-methyl-1,4-phenylene-bis{4-(2,3-epoxypropoxy)benzoate}, 4-{4-(2,3-epoxypropoxy)phenyl}cyclohexyl-4-(2,3-epoxypropoxy)benzoate, and 4-{4-(2,3-epoxypropoxy)phenyl}cyclohexyl-4-(2,3-epoxypropoxy)-3-methylbenzoate are particularly preferable from the viewpoints of the formation of the high-order structure after curing, the handleability, and easy availability of raw materials.

The epoxy resin serving as the constituent [B] may include a prepolymer in which a part of the prepolymer is partially polymerized with a hardener or the like. Of the constituents [B], the epoxy resins having the structure represented by the general formula (1) generally tends to be crystallized and a large number of the epoxy resins require high temperature for impregnating the carbon fiber. Including the prepolymer in which at least a part of the epoxy resin serving as the constituent [B] is polymerized tends to reduce the crystallization and thus the handleability becomes better. Therefore, this is a preferable aspect.

As a method for partially polymerizing the epoxy resin serving as the constituent [B], polymerization may be carried out using anionic polymerization catalysts such as tertiary amines and imidazole type compounds and cationic polymerization catalysts such as Lewis acid including a boron trifluoride amine complex or a prepolymerization agent having a functional group that can react with the epoxy resin may be used. In the case where the epoxy resin serving as the constituent [B] is partially polymerized, the method for using the prepolymerization agent is preferable because the molecular weight of the prepolymer to be produced is easily controlled. Excessively high molecular weight of the prepolymer results in reducing the cross-linking density of the resin included in the carbon fiber reinforced material and thus heat resistance and mechanical properties may deteriorate.

The prepolymerization agent for partially polymerizing the epoxy resin serving as the constituent [B] is not particularly limited as long as the prepolymerization agent is a compound having two to four active hydrogens that can react with the epoxy resin. Examples of the prepolymerization agent include a phenol compound, an amine compound, an amide compound, a sulfide compound, and an acid anhydride. Here, the active hydrogen refers to a hydrogen atom bonded to nitrogen, oxygen, or sulfur in an organic compound and having high reactivity. The prepolymerization agent having one active hydrogen results in reducing the cross-linking density of the cured epoxy resin using the prepolymer and thus heat resistance and mechanical properties may deteriorate. The prepolymerization agent having five or more active hydrogens causes difficulty in control of the reaction when the prepolymer of the epoxy resin serving as the constituent [B] is formed and may cause gelation. As the prepolymerization agent, a phenol compound having two or three active hydrogens is particularly suitable due to gelation inhibition during prepolymer formation reaction and storage stability of the prepolymer.

Of the phenol compounds having two to three active hydrogen atoms, the phenol compound having one to two benzene rings is suitable because the structure of the prepolymer of the epoxy resin serving as the constituent [B] is rigid and thus the high-order structure is easily formed and toughness tends to be improved. In addition, the viscosity of the resin composition including the prepolymer of the epoxy resin serving as the constituent [B], the epoxy resin serving as the constituent [B], and the hardener serving as the constituent [C] can be lowered and thus the handleability becomes excellent, which is suitable.

Examples of the phenol compound having two to three active hydrogens include catechol, resorcinol, hydroquinone, bisphenol A, bisphenol F, bisphenol G, bisphenol Z, tris(4-hydroxyphenyl)methane, and derivatives thereof. Examples of the derivatives include compounds in which an alkyl group having a carbon number of 1 to 8 or the like substitutes the hydrogen in the benzene ring. These phenol compounds may be used singly or in combination of two or more of them.

The molecular weight of the prepolymer included in the constituent [B] is not particularly limited. From the viewpoint of the fluidity of the resin composition, the number-average molecular weight is preferably 15,000 or less, preferably 10,000 or less, and further preferably 350 to 5,000. The number-average molecular weight in the present invention refers to a conversion molecular weight using standard polystyrene with GPC (Gel Permeation Chromatography, also referred to as SEC: Size Exclusion Chromatography). The number-average molecular weight of the entire constituent [B] included in the prepreg and carbon fiber reinforced material in this application is preferably 10,000 or less, preferably 5,000 or less, and further preferably 250 to 3,500. The number-average molecular weight described here refers to a value measured by all peaks originated from the constituent [B] in the case where the molecular weight difference between the monomer and prepolymer of the constituent [B] is large and peaks of GPC are separated into two or more.

The method for partially polymerizing the epoxy resin serving as the constituent [B] to form the prepolymer is not particularly limited. For example, the prepolymer can be synthesized by dissolving the constituent [B] and the prepolymerization agent in a synthetic solvent and stirring the mixture with heating. A catalyst may be used in the range where the gelation does not occur during the prepolymer formation reaction. The prepolymer can be synthesized without using the solvent. However, the constituent [B] has a high melting point and thus high temperature is required for the prepolymer formation reaction without the solvent. Consequently, a method for synthesizing the prepolymer using the synthetic solvent is preferable from the viewpoint of safety.

The constituent [B] including the prepolymer tends to inhibit crystallization and thus the handleability becomes excellent. However, an excessive content of the prepolymer results in excessively high melt viscosity of the resin composition including the constituent [B] and hardener serving as the constituent [C] and thus the resin composition may be difficult to be impregnated into the carbon fiber serving as the constituent [A]. In the case where the constituent [B] includes the prepolymer, the content of the prepolymer is preferably 80 parts by mass or less and more preferably in the range of 5 parts by mass to 60 parts by mass relative to 100 parts by mass of the total of the epoxy resin and the prepolymer in the constituent [B]. The ratio of the peak area originated from the prepolymer in the area of the peak originated from the entire epoxy resin in the resin composition in the measurement with the above-described GPC or HPLC (High Performance Liquid Chromatography) (Peak area originated from prepolymer/Peak area originated from entire epoxy resin in resin composition) is preferably 0.80 or less and more preferably in the range of 0.05 to 0.60. In the prepreg according to the present invention, entire components including at least the constituent [B] and the constituent [C] and excluding the constituent [A] are hereinafter referred to as the "resin composition". In the case where the resin composition is described in a particularly distinguished manner, the resin composition may be also referred to as the "resin composition made of the all components excluding the constituent [A]". As described below, the resin composition according to the present invention may include, for example, a thermoplastic resin and a filler that can be dispersed in the constituent [B].

As the resin composition according to the present invention including the constituent [B] and the constituent [C], a resin composition that causes transition from a crystal phase to a liquid crystal phase or a isotropic liquid at a temperature of less than 180° C. is preferable. The resin composition at a temperature causing transition from a crystal phase to a liquid crystal phase or an isotropic liquid at less than 180° C. allows the fluidity of the resin at the time of forming the carbon fiber reinforced material to be improved and an impregnating property into the carbon fiber to be improved. Consequently, this resin composition is likely to provide the carbon fiber reinforced material having less flaw such as voids.

In the prepreg and the carbon fiber reinforced material according to the present invention, a thermosetting resin and a copolymer of the epoxy resin and the thermosetting resin may be included, in addition to the epoxy resin serving as the constituent [B]. Examples of the above-described thermosetting resin include an unsaturated polyester resin, a vinyl ester resin, an epoxy resin, a benzoxazine resin, a phenol resin, a urea resin, a melamine resin, and a polyimide resin. These resin compositions and compounds may be used singly or may be used by appropriately blending. At least, the blend of the above-described thermosetting resin and the like to the epoxy resin serving as the constituent [B] allows the fluidity of the resin composition and the heat resistance of the cured resin to be improved.

Of the epoxy resins used as the constituent [B] in addition to the epoxy resin represented by the general formula (1), the glycidyl ether epoxy resin using phenol as a precursor is preferably used as the epoxy resin having di-functionality. Examples of such an epoxy resin include a bisphenol A epoxy resin, a bisphenol F epoxy resin, a bisphenol S epoxy resin, a naphthalene epoxy resin, a biphenyl epoxy resin, a urethane modified epoxy resin, a hydantoin epoxy resin, and a resorcinol epoxy resin.

A liquid bisphenol A epoxy resin, bisphenol F epoxy resin, and resorcinol epoxy resin have low viscosity and therefore these epoxy resins are preferably used in combination with other epoxy resin.

A solid bisphenol A epoxy resin provides a structure having a low cross-linking density compared with the liquid bisphenol A epoxy resin and consequently the heat resistance is lower. However, the solid bisphenol A epoxy resin provides a structure having higher toughness and thus the solid bisphenol A epoxy resin is used in combination with the glycidyl amine epoxy resin, or the liquid bisphenol A epoxy resin or bisphenol F epoxy resin.

The epoxy resin having a naphthalene skeleton provides a cured resin having low water absorption coefficient and high heat resistance. The biphenyl epoxy resin, a dicyclopentadiene epoxy resin, a phenolaralkyl epoxy resin, and a diphenylfluorene epoxy resin also provide cured resins having a low water absorption coefficient and thus are suitably used. The urethane modified epoxy resin and an isocyanate modified resin provide cured resins having high fracture toughness and elongation.

Examples of the commercially available product of the bisphenol A epoxy resin include "jER (registered trademark)" 825 (manufactured by Mitsubishi Chemical Corporation), "EPICLON (registered trademark)" 850 (manufactured by DIC Corporation), "Epotohto (registered trademark)" YD-128 (manufactured by Tohto Kasei Co., Ltd.), and DER-331 and DER-332 (both products are manufactured by Dow Chemical Company).

Examples of the commercially available product of the bisphenol F epoxy resin include "jER (registered trademark)" 806, "jER (registered trademark)" 807, and "jER (registered trademark)" 1750 (all product are manufactured by Mitsubishi Chemical Corporation), "EPICLON (registered trademark)" 830 (manufactured by DIC Corporation), and "Epotohto (registered trademark)" YD-170 (manufactured by Tohto Kasei Co., Ltd.).

Examples of the commercially available product of the resorcinol epoxy resin include "DENACOL (registered trademark)" EX-201 (manufactured by Nagase ChemteX Corporation).

Examples of the commercially available product of a glycidylaniline epoxy resin include GAN and GOT (both products are manufactured by Nippon Kayaku Co., Ltd).

Examples of the commercially available product of the biphenyl epoxy resin include NC-3000 (manufactured by Nippon Kayaku Co., Ltd).

Examples of the commercially available product of the urethane-modified epoxy resin include AER4152 (manufactured by Asahi Kasei Epoxy Co., Ltd).

Examples of the commercially available product of the hydantoin epoxy resin include AY238 (manufactured by Huntsman Advanced Materials Inc.).

Of the epoxy resins used as the constituent [B] in addition to the epoxy resin represented by the general formula (1), examples of the glycidyl amine epoxy resin having at least a tri-functionality include epoxy resins such as a diaminodiphenylmethane epoxy resin, a diaminodiphenyl sulfone epoxy resin, an aminophenol epoxy resin, a metaxylenediamine epoxy resin, a 1,3-bis(aminomethyl)cyclohexane epoxy resin, and an isocyanurate epoxy resin. Of these compounds, the diaminodiphenylmethane epoxy resin and the aminophenol epoxy resin are particularly preferably used due to well-balanced physical properties.

Examples of the glycidyl ether epoxy resin having at least a tri-functionality include epoxy resins such as a phenol novolac epoxy resin, an orthocresol novolac epoxy resin, a tris(hydroxyphenyl)methane epoxy resin, and a tetraphenylolethane epoxy resin.

Examples of the diaminodiphenlymethane epoxy resin as the commercially available product of the epoxy resin having at least a tri-functionality include ELM434 (manufactured by Sumitomo Chemical Co., Ltd.), "jER (registered trademark)" 604 (manufactured by Mitsubishi Chemical Corporation), "Araldite (registered trademark)" MY720, "Araldite (registered trademark)" MY721, "Araldite (registered trademark)" MY9512, and "Araldite (registered trademark)" MY9663 (all products are manufactured by Huntsman Advanced Materials Inc.), and "Epotohto (registered trademark)" YH-434 (manufactured by Tohto Kasei Co., Ltd.).

Examples of the commercially available product of the metaxylenediamine epoxy resin include TETRAD-X (manufactured by MITSUBISHI GAS CHEMICAL COMPANY, INC.).

Examples of the commercially available product of the 1,3-bis(aminomethyl)cyclohexane epoxy resin include TETRAD-C (manufactured by MITSUBISHI GAS CHEMICAL COMPANY, INC.).

Examples of the commercially available product of the isocyanurate epoxy resin include TEPIC-P (manufactured by Nissan Chemical Industries, Ltd.).

Examples of the commercially available product of the tris(hydroxyphenyl)methane epoxy resin include Tactix742 (manufactured by Huntsman Advanced Materials Inc.).

Examples of the commercially available product of the tetraphenylolethane epoxy resin include "jER (registered trademark)" 1031S (manufactured by Japan Epoxy Resin Co. Ltd.).

Examples of the commercially available product of the aminophenol epoxy resin include "jER (registered trademark)" 630 (manufactured by Japan Epoxy Resin Co. Ltd.), "Araldite (registered trademark)" MY0510 (manufactured by Huntsman Advanced Materials Inc.), "Araldite (registered trademark)" MY0600 (manufactured by Huntsman Advanced Materials Inc.), and "Araldite (registered trademark)" MY0610 (manufactured by Huntsman Advanced Materials Inc.).

Examples of the commercially available product of the phenol novolac epoxy resin include DEN431 and DEN438 (both products are manufactured by Dow Chemical Company) and "jER (registered trademark)" 152 (manufactured by Japan Epoxy Resin Co. Ltd.).

Examples of the commercially available product of the orthocresol novolac epoxy resin include EOCN-1020 (manufactured by Nippon Kayaku Co., Ltd) and "EPICLON (registered trademark)" N-660 (manufactured by DIC Corporation).

Examples of the commercially available product of the dicyclopentadiene epoxy resin include "EPICLON (registered trademark)" HP7200 (manufactured by DIC Corporation).

In the case where the resin composition according to the present invention including the constituent [B] and the constituent [C] includes the epoxy resin in addition to the epoxy resin having the structure represented by the general formula (1) and the thermosetting resin, the amount of these components to be blended is preferably 50 parts by mass or less, more preferably 30 parts by mass or less, and further preferably 10 parts by mass or less relative to the 100 parts by mass of the entire epoxy resin (including the epoxy resin represented by the general formula (1) and the other epoxy resin) of the constituent [B], the prepolymer of the epoxy resin, and other thermosetting resin.

Subsequently, the hardener for the constituent [B] serving as the constituent [C] according to the present invention will be described. The hardener serving as the constituent [C] according to the present invention is a hardener for the epoxy resin and a compound having an active group that can react with the epoxy group. Specific examples of the hardener include dicyandiamide, an aromatic polyamine, aminobenzoic acid esters, various acid anhydrides, a phenol novolac resin, a cresol novolac resin, a polyphenol compound, an imidazole derivative, an aliphatic amine, tetramethylguanidine, a thiourea-added amine, a carboxylic acid anhydride such as methyl hexahydrophthalic acid anhydride, a carboxylic amide, an organic acid hydrazide, polymercaptan, and a lewis complex such as a boron trifluoride ethylamine complex. These hardeners may be used singly or in combination of two or more of them.

Use of the aromatic polyamine as the hardener provides the cured epoxy resin having excellent heat resistance and thus is preferable. Of the aromatic polyamines, various isomers of diaminodiphenyl sulfone are particularly preferable hardeners for obtaining the fiber reinforced material having excellent heat resistance.

Use in combination of dicyandiamide and a urea compound such as 3,4-dichlorophenyl-1,1-dimethylurea or the imidazole type compounds as the hardener provides a fiber reinforced material having high heat and water resistance while curing at relatively low temperature. Curing of the epoxy resin using the acid anhydride provides a cured resin having low water absorption coefficient compared with the curing using the amine compound. As other aspect, a latent product of these hardeners, for example, a microencapsulation product, is used, whereby the storage stability of the prepreg, particularly a tackiness property or a draping property, is difficult to change when the prepreg is allowed to stand at room temperature.

The optimum value of the amount of the hardener to be added varies depending on the kind of the epoxy resin and the hardener. For example, the aromatic polyamine hardener is preferably added so as to be stoichiometrically equivalent. However, determining the ratio of the active hydrogen amount of the aromatic amine hardener to the epoxy group amount of the epoxy resin to be 0.7 to 1.0 may result in providing a resin having higher modulus than the modulus obtained in the case of using the hardener in equivalent and thus this ratio is a preferable aspect. On the other hand, determining the ratio of the active hydrogen amount of the aromatic amine hardener to the epoxy group amount of the epoxy resin to be 1.0 to 1.6 may result in providing a resin having high elongation in addition to increase in the curing rate and thus this ratio is also a preferable aspect. Consequently, the ratio of the active hydrogen amount of the hardener to the epoxy group amount of the epoxy resin is preferably in the range of 0.7 to 1.6.

Examples of the commercially available product of the aromatic polyamine hardener include SEIKACURE S (manufactured by Wakayama Seika Kogyo Co., Ltd.), MDA-220 (manufactured by Mitsui Chemicals, Inc.), "jER Cure (registered trademark)" W (manufactured by Japan Epoxy Resin Co. Ltd.), 3,3'-DAS (manufactured by Mitsui Chemicals, Inc.), "Lonzacure (registered trademark)" M-DEA (manufactured by Lonza Corporation), "Lonzacure (registered trademark)" M-DIPA (manufactured by Lonza Corporation), "Lonzacure (registered trademark)" M-MIPA (manufactured by Lonza Corporation), and "Lonzacure (registered trademark)" DETDA80 (manufactured by Lonza Corporation).

Examples of the commercially available product of dicyandiamide include DICY-7 and DICY-15 (both products are manufactured by Mitsubishi Chemical Corporation). The derivative of the dicyandiamide is a reaction product made by bonding dicyandiamide to various compounds. Examples of the reaction product include a reaction product with an epoxy resin, a reaction product with a vinyl compound, and a reaction product with an acrylic compound.

Each hardener may be used by combining with an accelerator or other hardeners for an epoxy resin. Examples of the accelerator to be used in combination include urea type compounds, imidazole type compounds, and Lewis acid catalysts.

For such urea compound, for example, N,N-dimethyl-N'-(3,4-dichlorophenyl)urea, toluene-bis(dimethylurea), 4,4'-methylenebis(phenyldimethylurea), and 3-phenyl-1,1-dimethylurea may be used. Examples of the commercially available product of such urea compound include DCMU99 (manufactured by Hodogaya Chemical Co., Ltd.) and "Omicure (registered trademark)" 24, 52, and 94 (all products are manufactured by CVC SpecialtyChemicals, Inc.).

Examples of the commercially available product of imidazole type compounds include 2MZ, 2PZ, and 2E4MZ (all products are manufactured by SHIKOKU CHEMICALS CORPORATION). Examples of Lewis acid catalysts include a complex of boron halide and a base such as a boron trifluoride piperidine complex, a boron trifluoride monoethylamine complex, and a boron trichloride octylamine complex.

Preferable examples of the organic acid hydrazide compound include 3-hydroxy-2-naphthoic acid hydrazide, 2,6-naphthalenedicarbodihydrazide, salicylic acid hydrazide, terephthalic acid dihydrazide, and isophthalic acid dihydrazide from the viewpoints of a curing acceleration property and storage stability. These organic acid hydrazide compounds may be used by mixing and blending two or more organic acid hydrazide compounds, if necessary. Examples of the commercially available product of the organic acid hydrazide compound include 2,6-naphthalenedicarbodihydrazide (manufactured by Japan Finechem Inc.) and isophthalic acid dihydrazide (manufactured by Otsuka Chemical Co., Ltd.).

The product of the preliminary reaction of these epoxy resins and hardeners or a part of these compounds may be blended into the resin composition. This method may be effective for viscosity control and improvement in storage stability.

The carbon fiber reinforced material according to the present invention achieves surprisingly excellent Mode I interlaminar toughness, Mode II interlaminar toughness, and tensile strength by including a resin region having molecular anisotropy that exhibits interference fringes in polarizing microscope observation of the resin composition in a crossed Nicol state. This is considered to be because much energy is required for breaking the anisotropic structure of the resin composition at the time of developing a crack in the carbon fiber reinforced material.

The term "anisotropic structure" means a state where the molecules are oriented and arrayed after curing or semi-curing the resin composition and means, for example, a state where the high-order structure such as a crystal structure or a liquid crystal structure exists in the cured product. That the resin composition includes the resin region having the molecular anisotropy after curing is also included. The term "resin region having anisotropy" represents an oriented domain in which molecules are oriented and arrayed in a diameter of 1 μm or more. As the high-order structure included in the resin composition becomes larger, the oriented domain tends to become larger.

For the resin region in which the high-order structure exists and that has the molecular anisotropy, the existence of the molecular anisotropy can be directly observed with a polarizing microscope. At the time of polarizing microscope observation of the cured resin and the resin part of the carbon fiber reinforced material in the crossed Nicol state, existence of a periodic structure can be determined in the case where interference fringes due to depolarization is observed. In the case where the high-order structure is not formed or the size of the formed high-order structure is smaller than the size in the order of the wavelength of visible light, dark field is observed because the resin region has no optical anisotropy. In the case of the liquid crystal structure, it has been known that a broad range of interference fringes is observed depending on the kinds of the formed liquid crystal phase. Specific examples of the observed interference fringes include a schlieren texture, a thread-like texture, a sand-like texture, and a droplet texture in the case where the high-order structure is a nematic phase structure and a bâtonnet texture, a focal conic fan texture, and an oily streak texture in the case where the high-order structure is a smectic phase structure.

Generally, the high-order structure of the resin composition can also be determined by the existence of a diffraction peak in the region of a diffraction angle of $2\theta \leq 10°$ in X-ray diffraction. With regard to the periodic structure (high-order structure) based on the mesogenic structure (for example, a biphenyl group, a terphenyl group, a terphenyl-related group, an anthracene group, a group formed by bonding these groups with an azomethine group or an ester group) existing in the constituent [B] or [C] or in both of the constituents [B] and [C], the resin composition is likely to form the periodic structure when the diffraction angle $2\theta$ is in the range of 1.0° to 6.0° and thus the resin toughness tends to be improved. It is important that the range of the diffraction angle $2\theta$ of the measured peak by X-ray diffraction is 1.0° to 6.0° and the preferable diffraction angle $2\theta$ is 2.0° to 4.0°. As the crystallite size formed of the periodic structure becomes larger, the resin has larger structure in which the molecules are oriented and arrayed, which is preferable. The maximum crystallite size is preferably 25 nm or more, more preferably 50 nm or more, and further preferably 100 nm or more.

In the measurement of X-ray diffraction of the resin composition or the like according to the present invention, the diffraction angle and the maximum crystallite size are values measured under the following conditions. Using the sample of the carbon fiber reinforced material or the like formed in a thickness of 1 mm, a measurement sample having a length of 40 mm and a width of 10 mm is prepared. The prepared measurement sample is measured by using a wide angle X-ray diffractometer under the following conditions.

X-ray source: CuKα line (X-ray tube voltage 45 kV and X-ray tube current 40 mA)

Detector: Goniometer+monochromator+scintillation counter

Scanning range: $2\theta = 1°$ to 90°

Scanning mode: Step scan, step unit 0.1°, and counting time 40 seconds

The crystallite size is obtained by determining the half value width of the peak appearing in the range of $2\theta = 1°$ to 10° in the diffraction pattern obtained by X-ray diffraction and calculating in accordance with following Scherrer's formulation. The term "maximum crystallite size" here refers to a maximum crystallite size in ten measurements with respect to each sample, $$\text{Crystallite size(nm)} = K\lambda/\beta_0 \cos\theta_B$$

where

K: 1.0 and λ: 0.15418 nm (Wavelength of X-ray)

$\beta_0: (\beta_E^2 - \beta_1^2)^{1/2}$ $\beta_E$: Apparent half value width (measured value) rad and $\beta_1$: $1.046 \times 10^{-2}$ rad $\theta_B$: Bragg's diffraction angle The measurement of X-ray diffraction is carried out at parallel (0°), perpendicular (90°), and 45° to the carbon fiber axis in the carbon fiber reinforced material.

The high-order structure of the resin composition may be directed in any direction to the carbon fiber serving as the constituent [A]. However, in the case where the resin composition only has the periodic structure in the perpendicular direction to the carbon fiber axis, the peak originated from the resin composition may fail to be observed by the X-ray diffraction due to the intense peak originated from the graphite structure of the carbon fiber. In this case, the presence or absence of the periodic structure can be confirmed by measuring X-ray diffraction using the cured plate of the resin composition from which the carbon fiber is removed or taking out the matrix resin alone from the carbon fiber reinforced material alone by grinding and measuring X-ray diffraction of the powder of the cured resin.

In the range where the resin composition after curing has the high-order structure derived from the diffraction angle $2\theta = 1.0°$ to $6.0°$ observed in X-ray diffraction, the molding conditions of the carbon fiber reinforced material according to the present invention is not particularly limited. However, excessively high molding temperature results in requiring an apparatus and auxiliary materials to be used having high heat resistance and thus the production cost of the carbon fiber reinforced material becomes high. Excessively low molding temperature results in requiring a long period of time for the reaction of the constituents [B] and [C] and thus the production cost may also become high. The maximum temperature used in the molding is preferably 100° C. to 220° C. and further preferably 120° C. to 200° C.

The high-order structure of the resin composition can also be confirmed by measuring the polarized IR spectroscopy or polarized Raman spectroscopy with determining an arbitrary direction to be 0° and changing the polarizing direction from 0° to 150° at intervals of 30° for 5 to 10 places in the resin region in the carbon fiber reinforced material and observing the presence or absence of the change in signal intensity to the polarizing direction. A resin composition having no anisotropy does not indicate the intensity change.

Existence of the crystal structure or the liquid crystal structure in the carbon fiber reinforced material according to the present invention makes change in the storage modulus of the cured epoxy resin small as a function of temperature. Consequently, the existence of the crystal structure or the liquid crystal structure can be indirectly confirmed by measuring the change in the storage modulus.

With respect to the prepreg and the carbon fiber reinforced material according to the present invention, the cured product obtained by curing the resin composition has an endothermic peak caused by liquid crystal phase transition preferably in the range of 250° C. or more, more preferably 280° C. or more, and further preferably 300° C. or more in differential scanning calorimetry. The endothermic peak caused by liquid crystal phase transition of the cured resin existing at such temperature allows the temperature range for maintaining the liquid crystal phase of the cured resin to widen and the cured resin achieving the excellent mechanical properties even at high temperature to be obtained. As the temperature of the liquid crystal phase transition becomes higher, the stronger high-order structure is formed. Consequently, the cured resin and the carbon fiber reinforced material tend to achieve more excellent mechanical properties. As a method for confirming the existence of the peak in the above-described range, for example, differential scanning calorimetry of the cured resin is carried out under a nitrogen atmosphere and the presence or the absence of the endothermic peak in a heat flow amount when the temperature is raised from 50° C. to 400° C. at a temperature ramp rate of 5° C./min is confirmed. In the confirmation of the liquid crystallinity by the differential scanning calorimetry, the cured resin may be used or the carbon fiber reinforced material may be used.

In the present invention, a thermoplastic resin is mixed with or dissolved into the resin composition including the above-described constituents [B] and [C] and the resultant mixture may also be used. Use of the thermoplastic resin allows the tackiness property of the obtained prepreg to be controlled and the fluidity of the resin composition at the time of molding the carbon fiber reinforced material to be controlled and thus the thermoplastic resin is preferably used. As such a thermoplastic resin, the thermoplastic resin having a bond selected from the group consisting of a carbon-carbon bond, an amide bond, an imide bond, an ester bond, an ether bond, a carbonate bond, a urethane bond, a thioether bond, a sulfone bond, and a carbonyl bond in the main chain is generally preferable. This thermoplastic resin may have a partial cross-linked structure and may be crystalline or noncrystalline. In particular, it is suitable that at least one resin selected from the group consisting of polyamide, polycarbonate, polyacetal, polyphenylene oxide, polyphenylene sulfide, polyarylate, polyester, polyamideimide, polyimide, polyetherimide, polyimide having a phenyltrimethylindane structure, polysulfone, polyethersulfone, polyetherketone, polyetheretherketone, polyaramid, polyethernitrile, and polybenzimidazole is mixed with or dissolved into any of the epoxy resins included in the resin composition.

Above all things, in order to obtain excellent heat resistance, the glass transition temperature (Tg) of the thermoplastic resin is 150° C. or more and preferably 170° C. or more. Use of the thermoplastic resin to be blended having a glass transition temperature of less than 150° C. may be likely to cause deformation by heat when the carbon fiber reinforced material is used as a molding. The thermoplastic resin having a terminal functional group such as a hydroxyl group, a carboxyl group, a thiol group, and an acid anhydride is preferably used because this thermoplastic resin can react with a cationic polymerizable compound. Specifically, "Sumika Excel (registered trademark)" PES3600P, "Sumika Excel (registered trademark)" PES5003P, "Sumika Excel (registered trademark)" PES5200P, and "Sumika Excel (registered trademark)" PES7600P (all products are manufactured by Sumitomo Chemical Company) and "Virantage (registered trademark)" VW-10200RFP and "Virantage (registered trademark)" VW-10700RFP (both products are manufactured by Solvay Advanced Polymers, LLC), which are commercially available products of polyethersulfone, can be used. In addition, examples of the thermoplastic resin include a copolymer oligomer of polyethersulfone and polyetherethersulfone as described in Japanese Translation of PCT International Application Publication No. JP-T-2004-506789, and "Ultem (registered trademark)" 1000, "Ultem (registered trademark)" 1010, and "Ultem (registered trademark)" 1040 (all products are manufactured by Solvay Advanced Polymers, LLC), which are commercially available products of polyetherimide. The oligomer refers to a relatively low molecular weight polymer in which about 10 to about 100 of the finite number of monomers are bonded.

In the present invention, an elastomer may be further blended to the resin composition including the above-described constituents [B] and [C]. Such an elastomer is blended for the purpose of forming a fine elastomer phase in the epoxy matrix phase after curing. This allows plane strain generated at the time of stress loading to the cured resin to be eliminated by forming fracture voids (cavitation) of the elastomer phase. As a result of inducing plastic deformation of the epoxy matrix phase, large energy absorption occurs. This leads to further improvement in the interlaminar toughness of the carbon fiber reinforced material.

The elastomer refers to a polymer material having domain having a glass transition temperature of less than 20° C. Examples of the elastomer include a liquid rubber, a solid rubber, cross-linked rubber particles, core-shell rubber particles, a thermoplastic elastomer, and a block copolymer having a block having a glass transition temperature of less than 20° C. Of these compounds, elastomers selected from the block copolymer having the block having a glass transition temperature of less than 20° C. and the rubber particles are preferable. This allows fine elastomer phase to be introduced while compatibility of the elastomer into the epoxy resin is being reduced and thus the interlaminar toughness as the carbon fiber reinforced material is significantly improved while the deterioration in heat resistance and modulus is being reduced.

As the rubber particles, the cross-linked rubber particles and the core shell rubber particles in which a different kind of polymer is graft-polymerized onto the surface of the cross-linked rubber particles are preferably used from the viewpoints of the handleability and the like. The primary particle diameter of such rubber particles is preferably in the range of 50 μm to 300 μm and particularly preferably 80 μm to 200 μm. Such rubber particles are preferably rubber particles that have excellent affinity to the epoxy resin to be used and do not cause secondary agglomeration during resin preparation and molding and curing.

As the commercially available products of the cross-linked rubber particles, FX501P made of the cross-linked product of a carboxyl-modified butadiene-acrylonitrile copolymer (manufactured by JSR Corporation), CX-MN series made of acrylic rubber fine particles (manufactured by NIPPON SHOKUBAI CO., LTD.), and YR-500 series (manufactured by NIPPON STEEL & SUMIKIN MATERIALS CO., LTD.) can be used.

As the commercially available products of the core shell rubber particles, "Paraloid (registered trademark)" EXL-2655 made of a butadiene-alkyl methacrylate-styrene copolymer (manufactured by KUREHA CORPORATION), "Staphyloid (registered trademark)" AC-3355 and TR-2122 made of an acrylic ester-methacrylic ester copolymer (manufacutred by Takeda Pharmaceutical Company), "PARALOID (registered trademark)" EXL-2611 and EXL-3387 (manufactured by Rohm & Haas Company), and "Kane Ace (registered trademark)" MX series (manufactured by KANEKA CORPORATION) made of a butyl acrylate-methyl methacrylate copolymer can be used.

In the present invention, blend of thermoplastic resin particles to the resin composition according to the present invention is also suitable. The blend of the thermoplastic resin particles allows toughness of the cured resin to be improved and the impact resistance of the cured resin to be improved when the carbon fiber reinforced material is prepared.

As the raw material of the thermoplastic resin particles used in the present invention, the same thermoplastic resins as the various thermoplastic resins previously exemplified can be used as the thermoplastic resin that can be used by mixing with or dissolving into the resin composition. The thermoplastic resin particles are preferably thermoplastic resin particles that retain the form in the particles from the view point of providing the stable adhesive strength and impact resistance when the carbon fiber reinforced material is prepared. Of these thermoplastic resins, polyamides are the most preferable thermoplastic resin. Of the polyamides, polyamide 12, polyamide 11, polyamide 6, polyamide 66, a polyamide 6/12 copolymer, and a polyamide (semi-IPN polyamide) forming semi IPN (macromolecular interpenetrating network structure) in the epoxy compounds described in Examples 1 to 7 in Japanese Patent Application Laid-open No. 2009-221460 are suitably used. As the shape of the thermoplastic resin particles, the shape may be spherical shape particles, non-spherical shape particles, or porous particles. The polymer particles having the spherical shape are a preferable aspect from the viewpoints that the spherical shape provides excellent elastic modulus due to not reducing the flow property of the resin and provides high impact resistance due to no origin of stress concentration.

Examples of the commercially available products of the polyamide particles include SP-500, SP-10, TR-1, TR-2, 842P-48, and 842P-80 (all products are manufactured by TORAY INDUSTRIES, INC.), "Orgasol (registered trademark)" 1002D, 2001UD, 2001EXD, 2002D, 3202D, 3501D, and 3502D (all products are manufactured by Arkema S.A.), "Grilamid (registered trademark)" TR90 (manufactured by EMS-CHEMIE AG.), "Trogamid (registered trademark)" CX7323, CX9701, and CX9704 (all products are manufactured by Degussa AG). These polyamide particles may be used singly or in combination with two or more of them.

To the resin composition according to the present invention, a coupling agent, thermosetting resin particles, a thermoplastic resin capable of being dissolved into the epoxy resin, or inorganic fillers such as silica gel, carbon black, clay, carbon nanotube, and metal powder may be blended within the range not impairing the effect of the present invention.

The mass fraction of the carbon fiber in the prepreg and the carbon fiber reinforced material according to the present invention is preferably 40% by mass to 90% by mass and more preferably 50% by mass to 80% by mass. Excessively low mass fraction of the carbon fiber results in excessively large mass of the obtained composite material and thus the advantage of the carbon fiber reinforced material excellent in specific strength and specific modulus may be impaired, whereas excessively high mass fraction of the carbon fiber is likely to cause defective impregnation of the resin composition and to provide the carbon fiber reinforced material having a large number of voids and thus the mechanical properties of the carbon fiber reinforced material may significantly deteriorate.

The prepreg according to the present invention can be suitably produced by a wet method in which the viscosity is lowered by dissolving the resin composition in a solvent such as methyl ethyl ketone and methanol to be impregnated into the carbon fiber and a hot melt method in which the viscosity of the epoxy resin composition is lowered by heating to be impregnated into the carbon fiber.

The wet method is a method in which the carbon fiber is immersed into the solution of the epoxy resin composition and thereafter is pulled out of the solution and the solvent is evaporated using an oven or the like to give the prepreg.

The hot melt method is a method in which the resin composition of which viscosity is lowered by heating is directly impregnated into the carbon fiber or a method for previously preparing a resin film made by applying the resin composition onto a sheet of release paper or the like, subsequently overlapping the resin film on both sides or one side of the carbon fiber, transferring and impregnating the resin composition by subjecting the overlapped carbon fiber to heating and pressurizing to give the prepreg. In the hot melt method, substantially no solvent remains in the prepreg and thus this method is a preferable aspect.

In the case where the prepreg is produced by the hot melt method, the viscosity of the resin composition is preferably 0.01 Pa·s to 30 Pa·s based on the minimum viscosity measured in accordance with the method described below. The minimum viscosity of the resin composition refers to the lowest value of a complex viscosity η* measured with a dynamic viscoelasticity measuring device using paralleled plates (ARES, manufactured by TA Instruments Inc.) under conditions of a frequency of 0.5 Hz and a plate distance of 1 mm at a temperature ramp rate of 2° C./minute in a temperature range of 40° C. to 180° C.

The prepreg according to the present invention preferably has an amount of the carbon fiber per unit area of 50 g/m$^2$ to 1,000 g/m$^2$. The prepreg having such an amount of the carbon fiber of less than 50 g/m$^2$ is required to increase the number of the laminated layers in order to obtain the predetermined thickness when the carbon fiber reinforced material is molded and thus the operation may be complicated. On the other hand, prepreg having such an amount of the carbon fiber of more than 1,000 g/m$^2$ tends to deteriorate the draping property of the prepreg.

As one example, the carbon fiber reinforced material of the present invention can be produced by a method of laminating the above-described prepregs according to the present invention in a predetermined form and molding the laminated prepregs by pressurizing and heating. As the method for applying heat and pressure, a press molding method, an autoclave molding method, a bag molding method, a wrapping method, and an internal pressure molding method are used. In particular, for the molding of the sporting goods, the wrapping method and the internal pressure molding method are preferably used.

The wrapping method is a method for winding the prepreg to a core metal such as a mandrel to mold a tube-like product made of the carbon fiber reinforced material and is a suitable method for producing a rod-like product such as the shaft of a golf club and a fishing rod. More specifically, the wrapping method is a method for winding the prepreg to the mandrel, winding the wrapping tape made of a thermoplastic resin film on the outer side of the prepreg in order to fix the prepreg and to apply pressure, curing the epoxy resin by heating in an oven, and providing the tube-like product by removing the core metal.

The internal pressure molding method is a method for setting the a preform formed by winding the prepreg to an internal pressure providing body such as a tube made of a thermoplastic resin into a mold and subsequently introducing high pressure gas into the internal pressure providing body to provide pressure and at the same time heating the mold to mold a tube-like product. This internal pressure molding method is particularly preferably used when complex shape products such as the shaft of a golf club, a bat, and rackets for tennis and badminton are molded.

The carbon fiber reinforced material according to the present invention can also be produced using the above-described resin composition not through the prepreg.

As such a method, a method for impregnating the resin composition according to the present invention including the constituents [B] and [C] directly into the carbon fiber and thereafter heating to cure, that is, a hand lay-up method, a filament winding method, and a pultrusion method and a method for impregnating the resin composition into the continuous fiber substrate that is previously formed as a part shape and curing, that is, a resin film infusion method, a resin injection molding method, a resin transfer molding method (RTM) and the like are used.

The resin composition according to the present invention is also suitably used in the molding methods such as VARTM (Vaccum-assisted Resin Transfer Molding), VIMP (Variable Infusion Molding Process), TERTM (Thermal Expansion RTM), RARTM (Rubber-Assisted RTM), RIRM (Resin Injection Recirculation Molding), CRTM (Continuous RTM), CIRTM (Co-injection Resin Transfer Molding), RLI (Resin Liquid Infusion), and SCRIMP (Seeman's Composite Resin Infusion Molding Process), which are described in a review for the RTM methods (SAMPE Journal, Vol. 34, No. 6, pp. 7-19).

Example

Hereinafter, the present invention will be described in detail with reference to Examples. However, the scope of the present invention is not limited to Examples. The unit of the composition ratio "part" means part by mass, unless otherwise particularly noted. The measurements of various properties (physical properties) are carried out under an environment at a temperature of 23° C. and a relative humidity of 50%, unless otherwise particularly noted.

<Raw Materials Used in Examples and Comparative Examples>

(1) Constituent [A]

Carbon Fiber 1 Dry-jet wet spinning and carbonization of a copolymer made of 99% by mole of acrylonitrile and 1% by mole of itaconic acid were carried out to give a carbon fiber having a total number of filaments of 24,000, a total fineness of 1,000 tex, a specific gravity of 1.8, a strand tensile strength of 6.6 GPa, and a strand Young's modulus of 324 GPa. Subsequently, the carbon fiber was subjected to electrochemical treatment of fiber surface at an electric quantity per 1 g of the carbon fiber of 80 coulombs using an aqueous ammonium hydrogen carbonate solution having a concentration of 0.1 mol/l as an electrolytic solution. This carbon fiber subjecting to electrochemical treatment of fiber surface was subsequently washed with water and dried in a heated air at a temperature of 150° C. to give the carbon fiber serving as the raw material. By measuring in accordance with the method described in (5) below, the surface oxygen concentration O/C was 0.16.

An aqueous dispersion emulsion made of 20 parts by mass of "jER (registered trademark)" 152 (manufactured by Mitsubishi Chemical Corporation); 20 parts by mass of a condensation product of 2 mol of 2 mol of ethylene oxide adduct of bisphenol A, 1.5 mol of maleic acid and, 0.5 mol of sebacic acid; and 10 parts by mass of an emulsifying agent was prepared and thereafter 50 parts by mass of polyglycerin polyglycidyl ether was mixed with this aqueous dispersion emulsion to prepare a sizing liquid. As the emulsifying agent, polyoxyethylenated (70 mol) styrenated (5 mol) cumylphenol was used.

This sizing agent was applied to the surface-treated carbon fiber by an immersing method and thereafter the applied carbon fiber was subjected to heat treatment at a temperature of 210° C. for 75 seconds to give a sizing agent-coated carbon fiber bundle. The attached amount of the sizing agent was adjusted so as to be 0.6% by mass relative to the sizing agent-coated carbon fiber.

Measurement of thus prepared carbon fiber in accordance with the method described in (7) below resulted in an attached amount of the sizing agent of 0.15% by mass after washing the sizing agent-coated carbon fiber, which was a preferable attached amount. The interface adhesion strength measured in accordance with the method described in (8) below was 44 MPa.

Carbon fiber 2

Dry-jet wet spinning and carbonization of a copolymer made of 99% by mole of acrylonitrile and 1% by mole of itaconic acid were carried out to give a carbon fiber having a total number of filaments of 12,000, a total fineness of 1,000 tex, a specific gravity of 1.8, a strand tensile strength of 4.9 GPa, and a strand Young's modulus of 230 GPa. Subsequently, the carbon fiber was subjected to electrochemical treatment of fiber surface at an electric quantity of 80 coulombs per 1 g of the carbon fiber using an aqueous ammonium hydrogen carbonate solution having a concentration of 0.1 mol/l as an electrolytic solution. This carbon fiber subjecting to electrochemical treatment of fiber surface was subsequently washed with water and dried in a heated air at a temperature of 150° C. to give the carbon fiber serving as the raw material. At this time, the surface oxygen concentration O/C was 0.15.

The sizing agent-coated carbon fiber bundle was obtained by the same method as the method in Carbon fiber 1 using this carbon fiber. The attached amount of the sizing agent was adjusted so as to be 0.6% by mass relative to the sizing agent-coated carbon fiber. The attached amount of the sizing agent of the sizing agent-coated carbon fiber after washing was 0.17% by mass, which was a preferable attached amount. The interface adhesion strength was 43 MPa.

Carbon Fiber 3

Dry-jet wet spinning and carbonization of a copolymer made of 99% by mole of acrylonitrile and 1% by mole of itaconic acid were carried out to give a carbon fiber having a total number of filaments of 24,000, a total fineness of 1,000 tex, a specific gravity of 1.8, a strand tensile strength of 5.9 GPa, and a strand Young's modulus of 294 GPa. Subsequently, the carbon fiber was subjected to electrochemical treatment of fiber surface at an electric quantity of 120 coulombs per 1 g of the carbon fiber using an aqueous ammonium hydrogencarbonate solution having a concentration of 0.1 mol/l as an electrolytic solution. This carbon fiber subjecting to electrochemical treatment of fiber surface was subsequently washed with water and dried in a heated air at a temperature of 150° C. to give the carbon fiber serving as the raw material. At this time, the surface oxygen concentration O/C was 0.20.

The sizing agent-coated carbon fiber bundle was obtained by the same method as the method in Carbon fiber 1 using this carbon fiber. The attached amount of the sizing agent was adjusted so as to be 0.6% by mass relative to the sizing agent-coated carbon fiber. The attached amount of the sizing agent after washing was 0.19% by mass, which was a preferable attached amount. The interface adhesion strength was 45 MPa.

Carbon Fiber 4

A sizing agent-coated carbon fiber bundle was obtained by the same method as the method in Carbon fiber 3 except that the electrochemical treatment of fiber surface was carried out at an electric quantity of 80 coulombs per 1 g of the carbon fiber. The surface oxygen concentration O/C was 0.15. The attached amount of the sizing agent was adjusted so as to be 0.6% by mass relative to the sizing agent-coated carbon fiber. The attached amount of the sizing agent after washing was 0.16% by mass, which was a preferable attached amount. The interface adhesion strength was 43 MPa.

Carbon Fiber 5

A sizing agent-coated carbon fiber bundle was obtained by the same method as the method in Carbon fiber 3 except that the electrochemical treatment of fiber surface was carried out at an electric quantity of 40 coulombs per 1 g of the carbon fiber. The surface oxygen concentration O/C was 0.13. The attached amount of the sizing agent was adjusted so as to be 0.6% by mass relative to the sizing agent-coated carbon fiber. The attached amount of the sizing agent after washing was 0.12% by mass, which was a preferable attached amount. The interface adhesion strength was 29 MPa.

Carbon Fiber 6

A sizing agent-coated carbon fiber bundle was obtained by the same method as the method in Carbon fiber 3 except that sulfuric acid having a concentration of 0.1 mol/l was used as the electrolytic solution and that the electrochemical treatment of fiber surface was carried out at an electric quantity of 20 coulombs per 1 g of the carbon fiber. The surface oxygen concentration O/C was 0.12. The attached amount of the sizing agent was adjusted so as to be 0.6% by mass relative to the sizing agent-coated carbon fiber. The attached amount of the sizing agent after washing was 0.13% by mass, which was a preferable attached amount. The interface adhesion strength was 27 MPa.

Carbon Fiber 7

A sizing agent-coated carbon fiber bundle was obtained by the same method as the method in Carbon fiber 6 except that the electrochemical treatment of fiber surface was carried out at an electric quantity of 10 coulombs per 1 g of the carbon fiber and that ethylene glycol was used instead of polyglycerin polyglycidyl ether. The surface oxygen concentration O/C was 0.09. The attached amount of the sizing agent was adjusted so as to be 0.6% by mass relative to the sizing agent-coated carbon fiber. The attached amount of the sizing agent after washing was 0.05% by mass. The interface adhesion strength was 21 MPa.

Carbon Fiber 8

The sizing agent-coated carbon fiber bundle was obtained by the same method as the method in Carbon fiber 7 except that the electrochemical treatment was not carried out. The surface oxygen concentration O/C was 0.02. The attached amount of the sizing agent was adjusted so as to be 0.6% by mass relative to the sizing agent-coated carbon fiber. The attached amount of the sizing agent after washing was 0.02% by mass. The interface adhesion strength was 18 MPa.

Carbon Fiber 9

A sizing agent-coated carbon fiber bundle was obtained by the same method as the method in Carbon fiber 4 except that "jER (registered trademark)" 828 (a bisphenol A epoxy resin, manufactured by Mitsubishi Chemical Corporation) was used instead of polyglycerin polyglycidyl ether. The surface oxygen concentration O/C was 0.15. The attached amount of the sizing agent was adjusted so as to be 0.6% by mass relative to the sizing agent-coated carbon fiber. The attached amount of the sizing agent after washing was 0.09% by mass, which was a preferable attached amount. The interface adhesion strength was 27 MPa.

Carbon Fiber 10

Dry-jet wet spinning and carbonization of a copolymer made of 99% by mole of acrylonitrile and 1% by mole of itaconic acid were carried out to give a carbon fiber having a total number of filaments of 24,000, a total fineness of 1,000 tex, a specific gravity of 1.8, a strand tensile strength of 5.9 GPa, and a strand Young's modulus of 294 GPa. The surface oxygen concentration O/C was 0.15. The obtained carbon fiber was not coated with the sizing agent. The attached amount of the sizing agent of the carbon fiber after washing was 0% by mass. The interface adhesion strength was 22 MPa.

Carbon Fiber 11

A fiber substrate made of a carbon fiber prepared by the following procedure is Carbon fiber 11. Carbon fiber 4 was arranged as warps in a density of 1.8 fiber/cm and glass fiber bundles ECDE-75-1/0-1.0Z (manufactured by Nitto Boseki Co., Ltd., number of filament: 800 filaments and fineness: 67.5 tex) as auxiliary warps that were parallelly and alternately aligned were arranged in a density of 1.8 fiber/cm to form a unidirectional sheet-like carbon fiber bundle group. Glass fiber bundles E-glass yarn ECE-225-1/0-1.0Z (manufactured by Nitto Boseki Co., Ltd., filament number: 200 filaments and fineness: 22.5 tex) were used as wefts and arranged in a direction perpendicular to the unidirectional sheet-like carbon fiber bundle group in a density of 3 fiber/cm. These materials were textured using a loom so that the auxiliary warps and the wefts were intersected with each other to produce a unidirectional non-crimp fabric in which the carbon fibers were substantially unidirectionally arranged and no crimp existed. The ratio of the fineness of the weft to the fineness of the carbon fiber in the obtained carbon fiber fabric was 2.2%, the ratio of the fineness of the auxiliary warp was 6.5%, and the fiber areal weight was 192 g/m$^2$.

(2) Constituent [B]

Epoxy resins having structure represented by general formula (1)

Epoxy Resin 1

Compound name: 2-methyl-1,4-phenylene-bis{4-(2,3-epoxypropoxy)benzoate}, refer to Japanese Patent Application Laid-open No. 2010-241797, epoxy equivalent weight: 245 g/eq)

Epoxy Resin 2

Compound name: 4-{4-(2,3-epoxypropoxy)phenyl}cyclohexyl-4-(2,3-epoxypropoxy)benzoate, refer to Japanese Patent No. 5,471,975, epoxy equivalent weight: 213 g/eq)

Epoxy resin 3

Epoxy resin 1 was heated and melted at 200° C. and resorcinol (hydroxyl group equivalent weight: 55 g/eq) as the prepolymerization agent was added to the melted resin so that Number of epoxy equivalent weight:Number of hydroxyl group equivalent weight was 100:25. The resultant mixture was heated at 200° C. for three hours to give Epoxy resin 3. The content of the prepolymer was 53 parts by mass relative to the 100 parts by mass of the total of Epoxy resin 1 and the prepolymer thereof. The epoxy equivalent weight measured in accordance with JIS K7236 was 353 g/eq.

Epoxy Resin 4

Epoxy resin 4 was obtained by the same method as the method in Epoxy resin 3 except that Epoxy resin 1 was replaced with Epoxy resin 2. The content of the prepolymer was 53 parts by mass relative to 100 parts by mass of the total of Epoxy resin 2 and the prepolymer thereof. The epoxy equivalent weight measured in accordance with JIS K7236 was 320 g/eq.

Epoxy Resin 5

Epoxy resin 5 was obtained by the same method as the method in Epoxy resin 4 except that prepolymerization agent was changed from resorcinol to bisphenol F (hydroxyl group equivalent weight: 100 g/eq) and that bisphenol F was added so that Number of epoxy equivalent weight:Number of hydroxyl group equivalent weight was 100:15. The content of the prepolymer was 38 parts by mass relative to 100 parts by mass of the total of Epoxy resin 2 and the prepolymer thereof. The epoxy equivalent weight measured in accordance with JIS K7236 was 309 g/eq.

Epoxy resins other than the epoxy resins having the structure represented by general formula (1)

"EPICLON (registered trademark)" 830 (bisphenol F epoxy resin, manufactured by DIC Corporation)

"jER (registered trademark)" YX4000H (biphenyl epoxy resin, manufactured by Mitsubishi Chemical Corporation).

"jER (registered trademark)" 604 (tetraglycidyl diaminodiphenylmethane, manufactured by Mitsubishi Chemical Corporation)

"Araldite (registered trademark)" MY0610 (triglycidyl m-aminophenol, manufactured by Huntsman Advanced Materials Inc.)

"jER (registered trademark)" 828 (bisphenol A epoxy resin, manufactured by Mitsubishi Chemical Corporation)

(3) Constituent [C]

"SEIKACURE" (registered trademark)-S (4,4'-diaminodiphenyl sulfone, manufactured by Wakayama Seika Kogyo Co., Ltd.)

3,3'-DAS (3,3'-diaminodiphenyl sulfone, manufactured by MITSUI FINE CHEMICALS, Inc.).

DICY7 (dicyandiamide, manufactured by Mitsubishi Chemical Corporation)

DCMU99 {3-(3,4-dichlorophenyl)-1,1-dimethylurea, accelerator, manufactured by Hodogaya Chemical Co., Ltd.}.

(4) Other Component

"Virantage (registered trademark)" VW-10700RFP (polyethersulfone, manufactured by Solvay Advanced Polymers, LLC), <Various Evaluation Method>

(5) Measurement of Surface Oxygen Concentration O/C of Carbon Fiber

The surface oxygen concentration O/C of the carbon fiber was determined by X-ray photoelectron spectroscopy in accordance with the following procedure. First, the carbon fiber from which contamination attached to the surface was removed with a solvent was cut into a length of 20 mm and spread on a sample support stage made of copper. Subsequently, a sample support stage was set in a sample chamber and the pressure in the sample chamber was maintained at 1×10$^{-8}$ Torr. Subsequently, measurement was carried out at a photoelectron takeoff angle of 90° using AlK$_{\alpha1,2}$ as an X-ray source. The binding energy value of the main peak (top peak) of C$_{1s}$ was adjusted to 284.6 eV as the correction value of the peak associated with electrostatic charge during the measurement. The main area of C$_{1s}$ was determined by drawing a linear base line in the range of 282 eV to 296 eV. The peak area of O$_{1s}$ was determined by drawing a linear base line in the range of 528 eV to 540 eV. Here, the surface oxygen concentration (O/C) refers to a value calculated as an atom number ratio from the ratio of the O$_{1s}$ peak area and the C$_{1s}$ peak area using the apparatus-specific sensitivity correction value. In the case where ESCA-1600 manufactured by ULVAC-PHI, Inc. was used as the X-ray photoelectron spectroscopy apparatus, the apparatus-specific sensitivity correction value was 2.33.

(6) Measurement of Attached Amount of Sizing Agent

The attached amount of the sizing agent in the sizing agent-coated carbon fiber was determined in accordance with the following procedure. First, 2±0.5 g of the sizing agent-coated carbon fiber was collected and subjected to the heat treatment at 450° C. for 15 minutes under a nitrogen atmosphere. A value obtained by dividing a mass change amount before and after the heat treatment by a mass before the heat treatment was determined to be the attached amount of the sizing agent.

(7) Measurement of Attached Amount of Sizing Agent after Washing Sizing Agent-Coated Carbon Fiber The attached amount of the sizing agent after washing the sizing agent-coated carbon fiber was measured as follows. First, to 10 ml of a solution prepared by mixing acetonitrile and chloroform in a volume ratio of 9:1, 2±0.5 g of sizing agent-coated carbon fiber was immersed and subjected to ultrasonic washing for 20 minutes to elute the sizing agent from the sizing agent-coated carbon fiber. Thereafter, the carbon fiber was sufficiently dried and the mass is measured. Furthermore, the carbon fiber after washing was subjected to heat treatment at 450° C. for 15 minutes under a nitrogen atmosphere. A value obtained by dividing a mass change amount before and after the heat treatment by a mass before the heat treatment was determined to be the attached amount of the sizing agent after washing.

(8) Measurement of Interface Shear Strength (IFSS)

The interface shear strength (IFSS) was measured in accordance with the following (a) to (d) procedures.

(a) Preparation of Resin

Each 100 parts by mass of bisphenol A epoxy compound "jER (registered trademark)" 828 (manufactured by Mitsubishi Chemical Corporation) and 14.5 parts by mass of meta-phenylenediamine (manufactured by Sigma-Aldrich Japan G. K.) was placed in a container. Thereafter, the compounds were heated at a temperature of 75° C. for 15 minutes in order to reduce the viscosity of the above-described jER 828 and to dissolve meta-phenylenediamine. Thereafter, both of the compounds were mixed sufficiently and the resultant mixture was subjected to vacuum defoaming at a temperature of 80° C. for about 15 minutes.

(b) Fixing Single Fiber of Carbon Fiber to Single-Use Mold

A single fiber was pulled out from the carbon fiber bundle and both edges of the single fiber were fixed in a dumbbell-shaped mold in a longitudinal direction in a state where constant tension was applied to the single fiber. Thereafter, in order to remove water attached to the carbon fiber and the mold, vacuum drying was carried out at a temperature of 80° C. for 30 minutes or more. The dumbbell-shaped mold was made of silicone rubber. A cast molding part had the shape of a center part width of 5 mm, a length of 25 mm, a both edge part width of 10 mm, and an entire length of 150 mm.

(c) From Resin Cast Molding to Curing

The resin prepared in accordance with the procedure (a) was poured into the mold after the vacuum drying in accordance with the procedure (b). The temperature was raised to 75° C. at a temperature ramp rate of 1.5° C./min, retained for 2 hours, thereafter raised to 125° C. at a temperature ramp rate of 1.5° C./min, retained for 2 hours, and thereafter lowered to 30° C. at a temperature lowering rate of 2.5° C./min. Thereafter, the molded resin was removed from the mold to give a test specimen.

(d) Measurement of Interface Shear Strength (IFSS)

Tensile tension was applied to the test specimen obtained by the procedure (c) in a fiber axis direction (longitudinal direction) at a strain rate of 0.3%/second to generate a strain of 12%. Thereafter, the number of fiber breaks N (breaks) in the center part of the test specimen in a range of 22 mm was measured with a polarizing microscope. Subsequently, an average broken fiber length la was calculated in accordance with the formula la (m)=22×1,000 (μm)/N (breaks). Subsequently, critical fiber length lc was calculated from the average broken fiber length la in accordance with the formula lc (μm)=(4/3)×la (μm). The strand tensile strength σ and the diameter d of the single fiber of the carbon fiber were measured and the interface shear strength IFSS, which is an indicator of the adhesive strength of the interface between the carbon fiber and the resin was calculated in accordance with the following formula. In Examples, the average of the value obtained by measuring five times was determined to be the test result.

Interface shear strength IFSS(MPa)=σ(MPa)×d(μm)/(2×lc)(μm).

(9) Preparation of Resin Composition

In a kneader, the resin component other than the hardener and the accelerator were charged in the predetermined amount in each blend ratio listed in Tables 1 and 2. The temperature of the resultant mixture was raised to 160° C. with kneading and the heated mixture was kneaded at 160° C. for 1 hour to give a clear viscous liquid. The temperature of the viscous liquid was lowered to 80° C. with kneading and thereafter the hardener and the accelerator were added to the cooled viscous liquid in predetermined amounts. The resultant mixture was further kneaded to give a resin composition.

(10) Preparation of Prepreg

The resin composition prepared in (9) was applied onto a sheet of release paper with a knife coater to prepare a resin film. Subsequently, to the sheet-like carbon fiber arranged in unidirection serving as the constituent [A], two resin films were overlapped on the both surfaces of the carbon fiber. The resin was impregnated into the carbon fiber by heating and pressurizing to give a unidirectional prepreg having a fiber areal weight of 190 g/m² and a mass fraction of the resin composition of 35%.

(11) Preparation of Composite Material Plate for Mode I Interlaminar Toughness ($G_{IC}$) Test and $G_{IC}$ Measurement A composite material plate for $G_{IC}$ test was prepared by the following operations (a) to (e) in accordance with JIS K7086 (1993).

(a) Twenty plies of the unidirectional prepreg prepared in (10) were laid-up in a state where the fiber direction was arranged. Here, a fluorocarbon resin film having a width of 40 mm and a thickness of 50 μm was sandwiched perpendicular to the fibber arrangement direction between the center surfaces of the laid-up (between the tenth ply and the eleventh ply).

(b) The laid-up prepreg was wrapped with a nylon film without uncovered part. The prepreg was heated and pressurized in an autoclave at 150° C. for 4 hours and at 180° C. for 2 hours under an internal pressure of 0.59 MPa and cured to form a unidirectional carbon fiber reinforced material.

(c) The unidirectional carbon fiber reinforced material obtained in (b) was cut into a test specimen having a width of 20 mm and a length of 195 mm. The cutting was carried out so that the fiber direction was in parallel with the length side of the test specimen.

(d) The adhesion part was peeled at the time of the test in the case where the block for pin load (length 25 mm, made of aluminum) described in JIS K7086 (1993) was used. Therefore, triangle shape grips were used instead of the block for pin load (FIG. 1). At the place 4 mm away from the one end (the side where the fluorocarbon resin film was sandwiched) of the test specimen, a notch having a length of 1 mm was formed at both ends in a width direction and the triangle shape grips were hooked. In the test, the load was applied to the test specimen by pulling the triangle shape grips with the cross head of Instron universal tester (manufactured by Instron Japan Co., Ltd.).

(e) In order to facilitate the observation of crack propagation, white paint was applied to both sides of the test specimen.

$G_{IC}$ was measured in accordance with the following procedure using the prepared composite material plate. In accordance with JIS K7086 (1993) Appendix 1, the test was carried out using Instron universal tester (manufactured by Instron Japan Co., Ltd.). The cross head speed was set to 0.5 mm/minute until the crack propagation reached 20 mm and 1 mm/minute after the crack propagation reached 20 mm. The test was carried out until the crack propagation reached 100 mm. $G_{IC}$ was calculated from the area of a load-displacement chart obtained during the test.

(12) Measurement of Mode II Interlaminar Toughness ($G_{IIC}$)

The same test specimen as the test specimen from (a) to (c) in the $G_{IC}$ test (11) was prepared to give a test specimen having a width of 20 mm and a length of 195 mm. In accordance with JIS K7086 (1993) Appendix 2, the $G_{IIC}$ test was carried out using this test specimen.

(13) Preparation of Composite Material Plate for 0° Tensile Strength Test and Measurement The unidirectional prepreg prepared in (10) was cut into a predetermined size. Six of the cut prepregs were laid-up in one direction and thereafter vacuum bag molding was carried out. The laid-up prepregs were heated and pressurized using an autoclave at 150° C. for 4 hours and at 180° C. for 2 hours under an internal pressure of 0.59 MPa and cured to give a unidirectional carbon fiber reinforced material. This unidirectional carbon fiber reinforced material obtained was cut into a piece having a width of 12.7 mm and a length of 230 mm. Tabs made of a glass fiber-reinforced plastic having 1.2 mm and a length of 50 mm were bonded to both ends of the piece to give a test specimen. The 0° tensile test of this test specimen was carried out in accordance with the specification of JIS K7073 (1988) using Instron universal tester.

(14) Preparation of Prepreg Using Fiber Substrate

The resin compositions were prepared by kneading the resin raw materials including the constituents [B] and [C] in a blend ratio listed in Tables 1 and 2. The resin composition was uniformly applied onto the fiber substrate of Carbon fiber 11 so that the fiber areal weight was 104 g/m². The resin coated surface was covered with an FEP film "TOYOFLON (registered trademark)" (manufactured by Toray Industries, Inc.) and heated at 150° C. Thereafter, the covered product was subjected to compaction under vacuum pressure of 600 mmHg or more to prepare a prepreg using the fiber substrate having a mass fraction of the resin composition of 35%.

(15) Molding of Composite Material Plate for Mode I Interlaminar Toughness ($G_{IC}$) and Mode II Interlaminar Toughness ($G_{IIC}$) Tests by Press Molding and Measurement (a) Twenty plies of the prepreg using the fiber substrate prepared in (14) were laid-up in a state where the fiber direction was arranged. Here, a fluorocarbon resin film having a width of 40 mm and a thickness of 50 μm was sandwiched perpendicular to the fibber arrangement direction between the center surfaces of the laminate (between the tenth ply and the eleventh ply).

(b) The laid-up prepregs were placed on a mold and thereafter flowed and molded with a heating-type press molding machine at 180° C. for 4 hours under pressurizing at 1.0 MPa to mold a unidirectional carbon fiber reinforced material.

(c) $G_{IC}$ was measured in the same method as the method in the $G_{IC}$ test of (c) to (e) in (7) and $G_{IIC}$ was measured in the same method as the method in the $G_{IIC}$ test in (8).

(16) Preparation of Composite Material Plate for 0° Tensile Strength Test by Press Molding and Measurement The prepreg using the fiber substrate prepared in (14) was cut into a predetermined size. Six of the cut prepregs were laid-up in one direction and thereafter vacuum bag molding was carried out. The laid-up prepregs were heated and pressurized using an autoclave at 150° C. for 4 hours and at 180° C. for 2 hours under an internal pressure of 0.59 MPa and cured to give a unidirectional carbon fiber reinforced material. This unidirectional carbon fiber reinforced material obtained was cut into a piece having a width of 12.7 mm and a length of 230 mm. Tabs made of a glass fiber-reinforced plastic having 1.2 mm and a length of 50 mm were bonded to both ends of the piece to give a test specimen. The 0° tensile test of this test specimen was carried out in accordance with the specification of JIS K7073 (1988) using Instron universal tester.

(17) Observation with Polarizing Microscope

The unidirectional prepreg prepared in (10) or (14) was cut into a width of 50 mm and a length of 50 mm. The fiber intervals were spread by hand so that the width of the prepreg was 80 mm or more and thereafter the prepreg was cured using an oven under conditions of 150° C. for 4 hours and 180° C. for 2 hours to give a test body of the carbon fiber reinforced material for observation. The resin region of the test body was observed with a polarizing microscope (manufactured by KEYENCE CORPORATION, VHX-5000, polarized filter is attached). The case where the high-order structure such as a fan shape texture and a focal conic texture was observed was determined to be "A", whereas the case where the high-order structure was not observed was determined to be "B".

(18) Measurement of Diffraction Angle 2θ by X-Ray Diffraction

The unidirectional prepreg prepared in (10) or (14) was laid-up so that the thickness was about 1 mm and thereafter the laid-up prepreg was wrapped with a nylon film without uncovered part. The prepreg was heated and pressurized in an autoclave at 150° C. for 4 hours and at 180° C. for 2 hours under an internal pressure of 0.59 MPa and cured to form a unidirectional carbon fiber reinforced material. The molded carbon fiber reinforced material was cut into a length of 40 mm and a width of 10 mm to give a test specimen. The measurement was carried out under following conditions at parallel (0°), perpendicular (90°), and 45° to the carbon fiber axis in the carbon fiber reinforced material.

Apparatus: X'PertPro (manufactured by PANalytical Division, Spectris Co., Ltd.)

X-ray source: CuKα line (X-ray tube voltage 45 kV and X-ray tube current 40 mA)

Detector: Goniometer+monochromator+scintillation counter

Scanning range: 2θ=1° to 90°

Scanning mode: Step scan, step unit 0.1°, and counting time 40 seconds

The peaks of the diffraction angle 2θ in the range of 1° to 10° are listed in Tables 1 and 2. In the case of no peak, "B" is listed.

(19) Measurement of Molecular Anisotropy in Cured Resin by Polarized Raman Spectroscopy From the carbon fiber reinforced material prepared in (11) and (15), a square having a side of 2 cm was cut out to give a test specimen. The measurement was carried out at arbitrary 5 places of the resin part in the carbon fiber reinforced material under the following conditions.

Apparatus: PDP320 (manufactured by PHOTO Design Corporation)
Beam diameter: 1 μm
Light source: YAG laser/1,064 nm
Diffraction grating: Single 300 gr/mm
Slit: 100 μm
Detector: CCD: Jobin Yvon 1024×256
Objective lens: ×100

An arbitrary direction of the measured test specimen was determined to be 0° and polarization direction was changed from 0° to 150° at intervals of 30° to measure polarized Raman spectroscopy. The case where a fluctuation range had a polarization direction of 20% or more at measured 5 places for the intensity of Raman band in the vicinity of 1,600 cm$^{-1}$ derived from C=C stretching vibration of the aromatic ring was determined to be anisotropy presence (A), whereas the case where the fluctuation range was less than 20% in any of polarization directions of 0° to 150° was determined to be anisotropy absence (B).

Examples 1 to 11 and Comparative Examples 1 and 2 and 4 to 6

In accordance with the blend ratio in Tables 1 and 2, the resin composition for the carbon fiber reinforced material was prepared by the procedure of (9) Preparation of resin composition. Using the obtained resin composition, the prepreg was obtained by the procedure of (10) Preparation of prepreg. Using the obtained prepreg, (11) Preparation of composite material plate for Mode I interlaminar toughness ($C_{10}$) test and $C_{10}$ measurement, (12) Measurement of Mode II interlaminar toughness ($G_{IIC}$), (13) Preparation of composite material plate for 0° tensile strength test and measurement, (17) Observation with polarizing microscope, (18) Measurement of diffraction angle 2θ by X-ray diffraction, and (19) Measurement of molecular anisotropy in resin composition by polarized Raman spectroscopy were carried out. The results are listed in Table 1 and 2.

Each of the measured results in Examples is as listed in Tables 1 and 2. As Examples 1 to 11, the carbon fiber reinforced materials having excellent Mode I interlaminar toughness ($G_{IC}$), Mode II interlaminar toughness ($G_{IIC}$), and tensile strength were obtained by the combination of the resin composition having the high-order structure and the carbon fiber having preferable surface oxygen concentration.

Both of Comparative Example 1 and 2 are combinations of the cured resin having the high-order structure and the carbon fiber having low surface oxygen concentration. It is found that both Mode I interlaminar toughness ($G_{IC}$) and Mode II interlaminar toughness ($G_{IIC}$) of Comparative Examples 1 and 2 are lower than those of Example 3, which uses the same constituents [B] and [C]. In particular, Mode I interlaminar toughness $G_{IC}$ and Mode II interlaminar toughness $G_{IIC}$ are dramatically improved by the present invention. Comparative Examples 4 to 6 provide the cured resins having no high-order structure and no resin region where the molecules has anisotropy. From the comparison of Comparative Example 4 with Example 1 and comparison of Comparative Examples 5 and 6 with Examples 2 to 5, compared with each of Examples using the same constituent [A], Comparative Examples provides lower Mode I interlaminar toughness $G_{IC}$, Mode II interlaminar toughness $G_{IIC}$, and tensile strength than those of Examples. It is found that, in particular, Mode I interlaminar toughness $G_{IC}$ and Mode II interlaminar toughness $G_{IIC}$ are dramatically improved by the present invention.

Examples 12 and 13 and Comparative Example 3

In accordance with the blend ratio in Tables 1 and 2, the resin composition for the carbon fiber reinforced material was prepared by the procedure of (9) Preparation of resin composition. Using the obtained resin composition, the prepreg was obtained by the procedure of (14) Preparation of prepreg using fiber substrate. Using the obtained prepreg, (15) Molding of composite material plate for Mode I interlaminar toughness ($G_{IC}$) and Mode II interlaminar toughness ($G_{IIC}$) tests by press molding and measurement, (16) Preparation of composite material plate for 0° tensile strength test by press molding and measurement, (17) Observation with polarizing microscope, (18) Measurement of diffraction angle 2θ by X-ray diffraction, and (19) Measurement of molecular anisotropy in resin composition by polarized Raman spectroscopy were carried out. The results are listed in Table 1 and 2.

Comparative Example 3 provides the cured resin having no high-order structure and no resin region where the molecules have anisotropy. From the comparison of Comparative Example 3 with Examples 12 and 13, compared with each of Examples using the same constituent [A], Comparative Example 3 provide lower Mode I interlaminar toughness $G_{IC}$, Mode II interlaminar toughness $G_{IIC}$, and tensile strength than those of Examples. It is found that, in particular, Mode I interlaminar toughness $G_{IC}$ and Mode II interlaminar toughness $G_{IIC}$ are dramatically improved by the present invention.

TABLE 1

|  |  | Example 1 | Example 2 | Example 3 | Example 4 | Example 5 |
|---|---|---|---|---|---|---|
| Constituent [A] | Carbon fiber 1 | ● |  |  |  |  |
|  | Carbon fiber 2 |  | ● | ● | ● | ● |
|  | Carbon fiber 3 |  |  |  |  |  |
|  | Carbon fiber 4 |  |  |  |  |  |
|  | Carbon fiber 5 |  |  |  |  |  |
|  | Carbon fiber 6 |  |  |  |  |  |
|  | Carbon fiber 7 |  |  |  |  |  |
|  | Carbon fiber 8 |  |  |  |  |  |
|  | Carbon fiber 9 |  |  |  |  |  |
|  | Carbon fiber 10 |  |  |  |  |  |
|  | Carbon fiber 11 |  |  |  |  |  |

TABLE 1-continued

| Constituent [B] | | | | | | |
|---|---|---|---|---|---|---|
| | Epoxy resin 1 | | | | | |
| | Epoxy resin 2 | | | | | |
| | Epoxy resin 3 | 100 | 100 | | | |
| | Epoxy resin 4 | | | 100 | 90 | 100 |
| | Epoxy resin 5 | | | | | |
| | "EPICLON (registered trademark)" 830 | | | | 5 | |
| | "jER (registered trademark)" YX4000 | | | | 5 | |
| | "jER (registered trademark)" 604 | | | | | |
| | "jER (registered trademark)" 828 | | | | | |
| Constituent [C] | "SEIKACURE (registered trademark)" S | | | | | |
| | 3,3'-DDS | 16 | 16 | 17 | 15 | |
| | DICY | | | | | 6 |
| | DCMU | | | | | 3 |
| Other resin component | "Virantage (registered trademark)" VW-10700RFP | | | | | |
| Characteristics of Constituent [A] | Surface oxygen concentration O/C | 0.16 | 0.15 | 0.15 | 0.15 | 0.15 |
| | Attached amount of sizing agent after washing (% by mass) | 0.15 | 0.17 | 0.17 | 0.17 | 0.17 |
| | Interface shear strength (MPa) | 44 | 43 | 43 | 43 | 43 |
| Characteristics of carbon fiber reinforced material | Observation result of polarizing microscope | A | A | A | A | A |
| | Diffraction angle 2θ by X-ray diffraction (°) | 3.4 | 3.4 | 3.4 | 3.4 | 3.5 |
| | Molecular anisotropy in matrix resin by polarized Raman spectroscopy | A | A | A | A | A |
| | $G_{IC}$ (in-lb/in$^2$) | 7.1 | 8.4 | 8.4 | 6.9 | 5.9 |
| | $G_{IIC}$ (in-lb/in$^2$) | 5.9 | 7.3 | 7.4 | 7.1 | 6.1 |
| | Tensile strength (ksi) | 508 | 392 | 401 | 396 | 391 |

| | | Example 6 | Example 7 | Example 8 | Example 9 | Example 10 |
|---|---|---|---|---|---|---|
| Constituent [A] | Carbon fiber 1 | | | | | |
| | Carbon fiber 2 | | | | | |
| | Carbon fiber 3 | ● | | | | |
| | Carbon fiber 4 | | ● | | | |
| | Carbon fiber 5 | | | ● | | |
| | Carbon fiber 6 | | | | ● | |
| | Carbon fiber 7 | | | | | |
| | Carbon fiber 8 | | | | | |
| | Carbon fiber 9 | | | | | ● |
| | Carbon fiber 10 | | | | | |
| | Carbon fiber 11 | | | | | |
| Constituent [B] | Epoxy resin 1 | | | | | |
| | Epoxy resin 2 | | | | | |
| | Epoxy resin 3 | | | | | |
| | Epoxy resin 4 | | | | | |
| | Epoxy resin 5 | 100 | 100 | 100 | 100 | 100 |
| | "EPICLON (registered trademark)" 830 | | | | | |
| | "jER (registered trademark)" YX4000 | | | | | |
| | "jER (registered trademark)" 604 | | | | | |
| | "jER (registered trademark)" 828 | | | | | |
| Constituent [C] | "SEIKACURE (registered trademark)" S | | | | | |
| | 3,3'-DDS | 18 | 18 | 18 | 18 | 18 |
| | DICY | | | | | |
| | DCMU | | | | | |
| Other resin component | "Virantage (registered trademark)" VW-10700RFP | | | | | |
| Characteristics of Constituent [A] | Surface oxygen concentration O/C | 0.20 | 0.15 | 0.13 | 0.12 | 0.15 |
| | Attached amount of sizing agent after washing (% by mass) | 0.19 | 0.16 | 0.12 | 0.13 | 0.09 |
| | Interface shear strength (MPa) | 45 | 43 | 29 | 27 | 27 |
| Characteristics of carbon fiber reinforced material | Observation result of polarizing microscope | A | A | A | A | A |
| | Diffraction angle 2θ by X-ray diffraction (°) | 3.2 | 3.2 | 3.2 | 3.2 | 3.2 |
| | Molecular anisotropy in matrix resin by polarized Raman spectroscopy | A | A | A | A | A |
| | $G_{IC}$ (in-lb/in$^2$) | 8.4 | 7.9 | 5.4 | 5.5 | 5.2 |
| | $G_{IIC}$ (in-lb/in$^2$) | 7.9 | 7.7 | 4.9 | 5.2 | 4.7 |
| | Tensile strength (ksi) | 485 | 470 | 450 | 447 | 439 |

TABLE 2

| | | Example 11 | Example 12 | Example 13 | Comparative Example 1 | Comparative Example 2 |
|---|---|---|---|---|---|---|
| Constituent [A] | Carbon fiber 1 | | | | | |
| | Carbon fiber 2 | | | | | |
| | Carbon fiber 3 | | | | | |
| | Carbon fiber 4 | | | | | |

TABLE 2-continued

| | | | | | | |
|---|---|---|---|---|---|---|
| Constituent [A] | Carbon fiber 5 | | | | | |
| | Carbon fiber 6 | | | | | |
| | Carbon fiber 7 | | | | ● | |
| | Carbon fiber 8 | | | | | ● |
| | Carbon fiber 9 | | | | | |
| | Carbon fiber 10 | ● | | | | |
| | Carbon fiber 11 | | ● | ● | | |
| Constituent [B] | Epoxy resin 1 | | 100 | | | |
| | Epoxy resin 2 | | | 100 | | |
| | Epoxy resin 3 | | | | | |
| | Epoxy resin 4 | | | | 100 | 100 |
| | Epoxy resin 5 | | | | | |
| | "EPICLON (registered trademark)" 830 | 100 | | | | |
| | "jER (registered trademark)" YX4000 | | | | | |
| | "jER (registered trademark)" 604 | | | | | |
| | "jER (registered trademark)" 828 | | | | | |
| Constituent [C] | "SEIKACURE (registered trademark)" S | | 23 | 26 | | |
| | 3,3'-DDS | 18 | | | 17 | 17 |
| | DICY | | | | | |
| | DCMU | | | | | |
| Other resin component | "Virantage (registered trademark)" VW-10700RFP | | | | | |
| Characteristics of Constituent [A] | Surface oxygen concentration O/C | 0.15 | 0.15 | 0.15 | 0.09 | 0.02 |
| | Attached amount of sizing agent after washing (% by mass) | 0 | 0.16 | 0.16 | 0.05 | 0.02 |
| | Interface shear strength (MPa) | 22 | 43 | 43 | 21 | 18 |
| Characteristics of carbon fiber reinforced material | Observation result of polarizing microscope | A | A | A | A | A |
| | Diffraction angle 2θ by X-ray diffraction (°) | 3.2 | 3.4 | 3.4 | 3.4 | 3.4 |
| | Molecular anisotropy in matrix resin by polarized Raman spectroscopy | A | A | A | A | A |
| | $G_{IC}$ (in-lb/in$^2$) | 4.9 | 6.2 | 6.5 | 2.8 | 2.6 |
| | $G_{IIC}$ (in-lb/in$^2$) | 4.3 | 6.3 | 5.9 | 3.1 | 3.2 |
| | Tensile strength (ksi) | 412 | 445 | 451 | 451 | 448 |

| | | Comparative Example 3 | Comparative Example 4 | Comparative Example 5 | Comparative Example 6 |
|---|---|---|---|---|---|
| Constituent [A] | Carbon fiber 1 | | ● | | |
| | Carbon fiber 2 | | | ● | ● |
| | Carbon fiber 3 | | | | |
| | Carbon fiber 4 | | | | |
| | Carbon fiber 5 | | | | |
| | Carbon fiber 6 | | | | |
| | Carbon fiber 7 | | | | |
| | Carbon fiber 8 | | | | |
| | Carbon fiber 9 | | | | |
| | Carbon fiber 10 | | | | |
| | Carbon fiber 11 | ● | | | |
| Constituent [B] | Epoxy resin 1 | | | | |
| | Epoxy resin 2 | | | | |
| | Epoxy resin 3 | | | | |
| | Epoxy resin 4 | | | | |
| | Epoxy resin 5 | | | | |
| | "EPICLON (registered trademark)" 830 | | | | |
| | "jER (registered trademark)" YX4000 | | | | 50 |
| | "jER (registered trademark)" 604 | 100 | 100 | 60 | 50 |
| | "jER (registered trademark)" 828 | | | 40 | |
| Constituent [C] | "SEIKACURE (registered trademark)" S | 50 | | | |
| | 3,3'-DDS | | 50 | 50 | 40 |
| | DICY | | | | |
| | DCMU | | | | |
| Other resin component | "Virantage (registered trademark)" VW-10700RFP | 5 | | | 5 |
| Characteristics of Constituent [A] | Surface oxygen concentration O/C | 0.15 | 0.16 | 0.16 | 0.16 |
| | Attached amount of sizing agent after washing (% by mass) | 0.16 | 0.15 | 0.15 | 0.15 |
| | Interface shear strength (MPa) | 43 | 44 | 43 | 43 |
| Characteristics of carbon fiber reinforced material | Observation result of polarizing microscope | B | B | B | B |
| | Diffraction angle 2θ by X-ray diffraction (°) | B | B | B | B |
| | Molecular anisotropy in matrix resin by polarized Raman spectroscopy | B | B | B | B |
| | $G_{IC}$ (in-lb/in$^2$) | 1.9 | 1.8 | 2.2 | 2.6 |
| | $G_{IIC}$ (in-lb/in$^2$) | 1.8 | 2.2 | 2.4 | 2.5 |
| | Tensile strength (ksi) | 376 | 452 | 363 | 356 |

The invention claimed is:

1. A prepreg comprising the following constituents [A] to [C] and satisfying the following conditions (I) and (II):
[A]: a carbon fiber;
[B]: an epoxy resin; and
[C]: a hardener for [B], and
(I) a surface oxygen concentration O/C of [A] measured by X-ray photoelectron spectroscopy is 0.10 or more; and
(II) a cured product obtained by curing [B] and [C] includes a resin region having molecular anisotropy exhibiting interference fringes in polarizing microscope observation in a crossed Nicol state,
wherein the epoxy resin [B] is an epoxy resin having a structure represented formula (1)

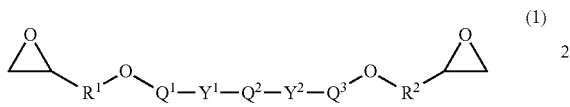

wherein
$Q^1$, $Q^2$, and $Q^3$ in formula (1) each include one structure selected from a group (I) below;
$R^1$ and $R^2$ in formula (1) each represent an alkylene group having a carbon number of 1 to 6;
Z in the group (I) below each independently represents an aliphatic hydrocarbon group having a carbon number of 1 to 8, an aliphatic alkoxy group having a carbon number of 1 to 8, a fluorine atom, a chlorine atom, a bromine atom, an iodine atom, a cyano group, a nitro group, or an acetyl group;
n in the group (I) below each independently represents an integer of 0 to 4;
$Y^1$, $Y^2$, and $Y^3$ each in formula (1) and the group (I) below represent a linking group formed of a single bond or at least one divalent group selected from group (II) below:

group (I)

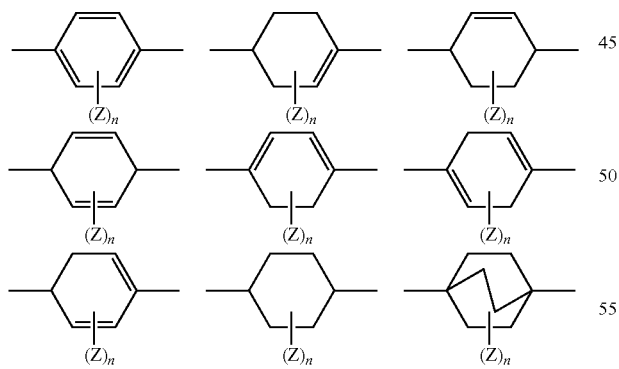

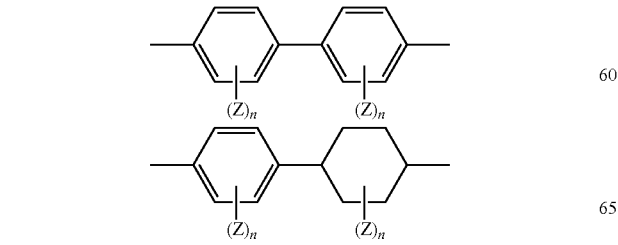

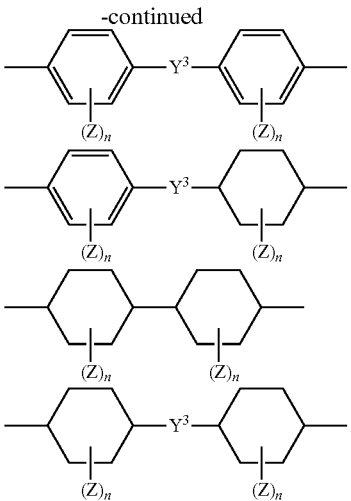

group (II)

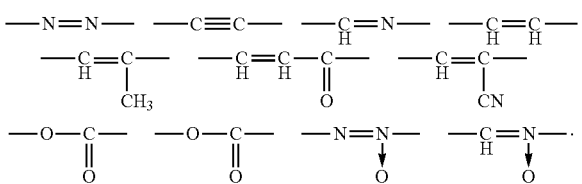

2. The prepreg according to claim 1, wherein [A] is a sizing agent-coated carbon fiber formed by applying a sizing agent comprising an epoxy compound.

3. The prepreg according to claim 2, wherein an attached amount of the sizing agent after washing the sizing agent-coated carbon fiber measured in accordance with a method defined in the present specification is 0.08% by mass or more relative to the sizing agent-coated carbon fiber.

4. A carbon fiber reinforced material formed by curing the prepreg according to claim 1.

5. A carbon fiber reinforced material comprising the following constituent [A] and a cured product of the following constituents [B] and [C], and which satisfies the following conditions (I) and (II):
[A]: a carbon fiber;
[B]: an epoxy resin; and
[C]: a hardener for [B], and
(I) a surface oxygen concentration O/C of [A] measured by X-ray photoelectron spectroscopy is 0.10 or more; and
(II) a cured product obtained by curing [B] and [C] includes a resin region having molecular anisotropy exhibiting interference fringes in polarizing microscope observation in a crossed Nicol state,
wherein the epoxy resin [B] is an epoxy resin having a structure represented by formula (1)

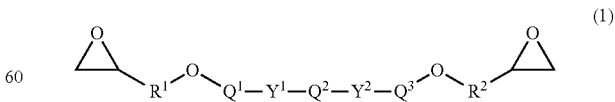

wherein
$Q^1$, $Q^2$, and $Q^3$ in formula (1) each include one structure selected from a group (I) below;
Z and $R^2$ in formula (1) each represent an alkylene group having a carbon number of 1 to 6;

Z in the group (I) below each independently represents an aliphatic hydrocarbon group having a carbon number of 1 to 8, an aliphatic alkoxy group having a carbon number of 1 to 8, a fluorine atom, a chlorine atom, a bromine atom, an iodine atom, a cyano group, a nitro group, or an acetyl group;

n in the group (I) below each independently represents an integer of 0 to 4;

$Y^1$, $Y^2$, and $Y^3$ each in formula (1) and the group (I) below represent a linking group formed of a single bond or at least one divalent group selected from group (II) below:

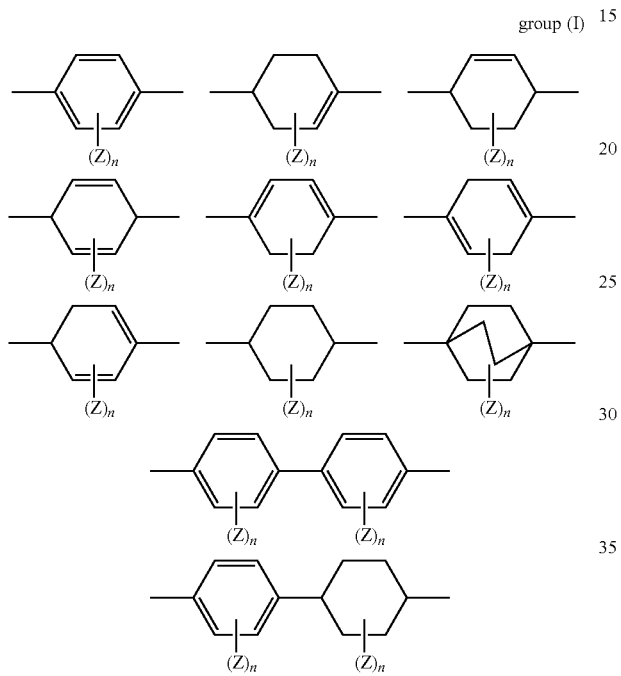

group (I)

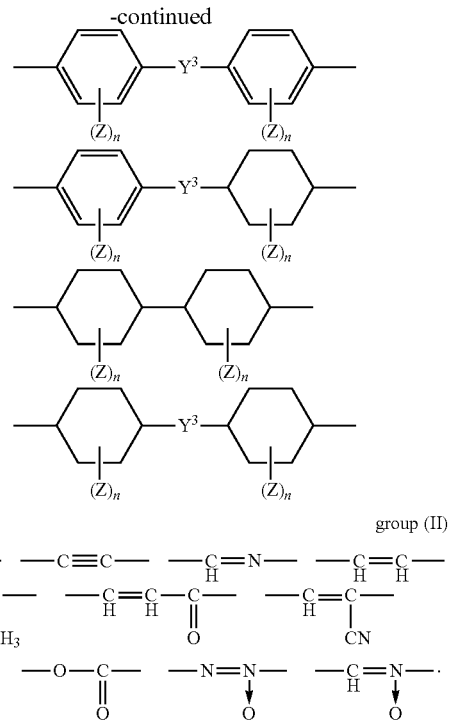

group (II)

6. The prepreg according to claim 1, wherein the epoxy resin [B] is a diaminodiphenyl sulfone.

7. The carbon fiber reinforced material according to claim 5, wherein the epoxy resin [B] is a diaminodiphenyl sulfone.

8. The prepreg according to claim 1, wherein an attached amount of a sizing agent, after washing a sizing agent-coated carbon fiber measured in accordance with a method defined in the present specification, is 0.12% by mass or more relative to the sizing agent-coated carbon fiber, the sizing agent-coated carbon fiber being formed by applying the sizing agent to the carbon fiber [A].

* * * * *